US012771436B2

(12) United States Patent
Al-Mufti et al.

(10) Patent No.: US 12,771,436 B2
(45) Date of Patent: Oct. 20, 2026

(54) NON-TERRESTRIAL FRONTHAUL NETWORK ARCHITECTURES

(71) Applicant: Boost SubscriberCo L.L.C., Englewood, CO (US)

(72) Inventors: Khalid Al-Mufti, Sterling, VA (US); Mehdi Alasti, Arlington, VA (US); Sourabh Gupta, Ashburn, VA (US); Jingyi Zhou, Belle Mead, NJ (US)

(73) Assignee: Boost SubscriberCo L.L.C., Englewood, CO (US)

( * ) Notice: Subject to any disclaimer, the term of this patent is extended or adjusted under 35 U.S.C. 154(b) by 202 days.

(21) Appl. No.: 18/816,992

(22) Filed: Aug. 27, 2024

(65) Prior Publication Data

US 2025/0373323 A1 Dec. 4, 2025

Related U.S. Application Data

(60) Provisional application No. 63/653,630, filed on May 30, 2024.

(51) Int. Cl.
*H04B 7/185* (2006.01)

(52) U.S. Cl.
CPC ................................ *H04B 7/18513* (2013.01)

(58) Field of Classification Search
CPC .............. H04B 7/18513; H04B 7/1851; H04B 7/18515; H04B 7/18517; H04B 7/18519; H04B 7/19
See application file for complete search history.

(56) References Cited

U.S. PATENT DOCUMENTS

| | | | | |
|---|---|---|---|---|
| 2022/0200695 | A1 | 6/2022 | Ren et al. | |
| 2023/0362652 | A1 | 11/2023 | Reis et al. | |
| 2024/0179653 | A1* | 5/2024 | Wu | H04W 56/00 |
| 2025/0227527 | A1* | 7/2025 | Li | H04W 52/0219 |

FOREIGN PATENT DOCUMENTS

| | | |
|---|---|---|
| TW | I833472 B | 2/2024 |

* cited by examiner

*Primary Examiner* — Keith Ferguson
(74) *Attorney, Agent, or Firm* — Kilpatrick Townsend & Stockton LLP

(57) ABSTRACT

Techniques for supporting non-terrestrial fronthaul network architectures are provided. In one example, a wireless network includes: a satellite comprising a radio unit; a satellite gateway in communication with the satellite; and a distributed unit located on Earth and in communication with the satellite gateway. Using ephemeris data for the satellite and the location of the gateway, maximum and minimum distances between the gateway and the satellite are determined for a time period when the satellite will be in line-of-sight communication with the satellite gateway. Based on the maximum and minimum distances, maximum and minimum propagation times for signals exchanged between the satellite and the gateway during the time period are determined. Using the maximum and minim propagation times, the distributed unit coordinates uplink and downlink transmission windows with the radio unit.

20 Claims, 7 Drawing Sheets

NON-TERRESTRIAL FRONTHAUL NETWORK ARCHITECTURES

CROSS REFERENCE TO RELATED APPLICATIONS

This application claims priority to U.S. Provisional Patent Application No. 63/653,630, filed on May 30, 2024, the disclosure of which is incorporated by reference in its entirety for all purposes.

BACKGROUND

Wireless networks are highly complex distributed systems that involve a large number of components that need to communicate with each other. In order to synchronize communications, clock signals for the various components may need to be synchronized. If the clock signals are not synchronized, packet loss can occur or even failure of the wireless network to function.

SUMMARY

Embodiments described herein pertain to non-terrestrial fronthaul network architectures. In some embodiments, a wireless network system is provided. The wireless network may include: a satellite comprising a radio unit and an antenna; a distributed unit located on Earth that manages the radio unit of the satellite; and a satellite gateway in communication with the distributed unit. The satellite gateway may be configured to receive ephemeris data for the satellite. The satellite gateway may be further configured to initiate a sequence of clock synchronization transmissions between the radio unit of the satellite and the satellite gateway. The satellite gateway may be further configured to determine, using the ephemeris data and a location of the satellite gateway, a first propagation time for a first clock synchronization transmission and a second propagation time for a second clock synchronization transmission. The satellite gateway may be further configured to generate a clock synchronization correction factor based on the first propagation time, the second propagation time, or both. The satellite gateway may be further configured to transmit the clock synchronization correction factor in a clock synchronization transmission of the sequence of clock synchronization transmissions to the satellite for receipt by the radio unit. In response to receiving a final clock synchronization transmission of the sequence of clock synchronization transmissions, the radio unit of the satellite may be configured to determine an offset between a clock signal of the radio unit and a clock signal of the distributed unit based on information about the sequence of clock synchronization transmissions in combination with the clock synchronization correction factor.

In some embodiments, the first clock synchronization transmission comprises a first timestamp generated from a clock signal of the satellite gateway at a first time when the first clock synchronization transmission is transmitted from the satellite gateway to the radio unit and the final clock synchronization transmission comprises a second timestamp generated from the clock signal of the satellite gateway at a second time when the second clock synchronization transmission is received from the radio unit by the satellite gateway. In some embodiments, the information about the sequence of clock synchronization transmissions comprises: the first timestamp; the second timestamp; a third timestamp generated from the clock signal of the radio unit at a third time when the first clock synchronization transmission is received from the satellite gateway by the radio unit; and a fourth timestamp generated from the clock signal of the radio unit at a fourth time when the second clock synchronization transmission is transmitted from the radio unit to the satellite gateway.

In some embodiments, determining the first propagation time comprises determining a first distance between a first location of the satellite and the location of the satellite gateway at the first time. In some embodiments, determining the second propagation time comprises determining a second distance between a second location of the satellite and the location of the satellite gateway at the second time. In some embodiments, determining the first propagation time comprises determining a first distance between a first location of the satellite and the location of the satellite gateway at the third time. In some embodiments, determining the second propagation time comprises determining a second distance between a second location of the satellite and the location of the satellite gateway at the fourth time.

In some embodiments, transmitting the clock synchronization correction factor to the radio unit comprises modifying the first timestamp, the second timestamp, or both, based on the first propagation time, the second propagation time, or both. In some embodiments, generating the clock synchronization correction factor comprises determining a difference between the first propagation time and the second propagation time. In some embodiments, the clock synchronization transmission comprising the clock synchronization correction factor is the final clock synchronization transmission.

In some embodiments, the clock synchronization correction factor is a first clock synchronization correction factor based on the first propagation time and the clock synchronization transmission comprising the first clock synchronization correction factor is the first clock synchronization transmission. In some embodiments, the satellite gateway is further configured to: generate a second clock synchronization correction factor based on the second propagation time and transmit the second clock synchronization correction factor to the radio unit in the final clock synchronization transmission. In some embodiments, the offset is further based on the second clock synchronization correction factor.

In some embodiments, transmitting the clock synchronization correction factor to the radio unit comprises updating a value in a preexisting field of the final clock synchronization transmission defined by an industrial standard. In some embodiments, the preexisting field is defined by the IEEE 1588 standard. In some embodiments, the satellite gateway is further configured to: determine, using the ephemeris data and the location of the satellite gateway, a first time when the first clock synchronization transmission can be received by the radio unit from the satellite gateway; identify a second time that is before the first time where the difference between the first time and the second time is less than or equal to the first propagation time; and transmit the first clock synchronization transmission to the radio unit at the second time.

In some embodiments, a method of synchronizing clock signals between terrestrial and non-terrestrial components of a wireless network is provided. The method may include receiving, by a satellite gateway, ephemeris data for a satellite, wherein the satellite comprises a radio unit. The method may further include initiating, by the satellite gateway, a sequence of clock synchronization transmissions between the satellite gateway and the radio unit. The method may further include determining, by the satellite gateway using the ephemeris data and a location of the satellite gateway, a first propagation time for a first clock synchronization transmission and a second propagation time for a second clock synchronization transmission. The method may further include generating, by the satellite gateway, a clock synchronization correction factor based on the first propagation time, the second propagation time, or both. The method may further include transmitting, by the satellite gateway, the clock synchronization correction factor to the radio unit in a clock synchronization transmission of the sequence of clock synchronization transmissions. In response to receiving a final clock synchronization transmission of the sequence of clock synchronization transmissions, the radio unit may determine an offset between a clock signal of the radio unit and a clock signal of the satellite gateway based on information about the sequence of clock synchronization transmissions in combination with the clock synchronization correction factor.

In some embodiments, the first clock synchronization transmission comprises a first timestamp generated from a clock signal of the satellite gateway at a first time when the first clock synchronization transmission is transmitted from the satellite gateway to the radio unit. In some embodiments, the final clock synchronization transmission comprises a second timestamp generated from the clock signal of the satellite gateway at a second time when the second clock synchronization transmission is received from the radio unit by the satellite gateway. In some embodiments, the information about the sequence of clock synchronization transmissions comprises: the first timestamp; the second timestamp; a third timestamp generated from the clock signal of the radio unit at a third time when the first clock synchronization transmission is received from the satellite gateway by the radio unit; and a fourth timestamp generated from the clock signal of the radio unit at a fourth time when the second clock synchronization transmission is transmitted from the radio unit to the satellite gateway.

In some embodiments, determining the first propagation time comprises determining a first distance between a first location of the satellite and the location of the satellite gateway at the first time. In some embodiments, determining the second propagation time comprises determining a second distance between a second location of the satellite and the location of the satellite gateway at the second time. In some embodiments, determining the first propagation time comprises determining a first distance between a first location of the satellite and the location of the satellite gateway at the third time. In some embodiments, determining the second propagation time comprises determining a second distance between a second location of the satellite and the location of the satellite gateway at the fourth time. In some embodiments, generating the clock synchronization correction factor comprises determining a difference between the first propagation time and the second propagation time. In some embodiments, the clock synchronization transmission comprising the clock synchronization correction factor is the final clock synchronization transmission.

In some embodiments, a satellite gateway is provided. The satellite gateway may include: one or more processors; and a memory connected to the one or more processors storing one or more computer-readable instructions which, when executed by the one or more processors, cause the one or more processors to receive ephemeris data for a satellite, wherein the satellite comprises a radio unit. The instructions may further cause the processors to initiate a sequence of clock synchronization transmissions between the satellite gateway and the radio unit. The instructions may further cause the processors to determine, using the ephemeris data and a location of the satellite gateway, a first propagation time for a first clock synchronization transmission and a second propagation time for a second clock synchronization transmission. The instructions may further cause the processors to generate a clock synchronization correction factor based on the first propagation time, the second propagation time, or both. The instructions may further cause the processors to transmit the clock synchronization correction factor to the radio unit in a clock synchronization transmission of the sequence of clock synchronization transmissions. In response to receiving a final clock synchronization transmission of the sequence of clock synchronization transmissions, the radio unit may determine an offset between a clock signal of the radio unit and a clock signal of the satellite gateway based on information about the sequence of clock synchronization transmissions in combination with the clock synchronization correction factor.

In some embodiments, generating the clock synchronization correction factor comprises determining a difference between the first propagation time and the second propagation time. In some embodiments, the clock synchronization transmission comprising the clock synchronization correction factor is the final clock synchronization transmission. In some embodiments, the clock synchronization correction factor is a first clock synchronization correction factor based on the first propagation time; the clock synchronization transmission comprising the first clock synchronization correction factor is the first clock synchronization transmission; and the one or more computer-readable instructions further cause the one or more processors to: generate a second clock synchronization correction factor based on the second propagation time; and transmit the second clock synchronization correction factor to the radio unit in the final clock synchronization transmission, wherein the offset is further based on the second clock synchronization correction factor.

In some embodiments, transmitting the clock synchronization correction factor to the radio unit comprises updating a value in a preexisting field of the final clock synchronization transmission defined by an industrial standard. In some embodiments, the one or more computer-readable instructions further cause the one or more processors to: determine, using the ephemeris data and the location of the satellite gateway, a first time when the first clock synchronization transmission can be received by the radio unit from the satellite gateway; identify a second time that is before the first time where the difference between the first time and the second time is less than or equal to the first propagation time; and transmit the first clock synchronization transmission to the radio unit at the second time.

In some embodiments, a wireless network is provided. The wireless network may include: a satellite comprising a radio unit and an antenna. The wireless network may further include a satellite gateway in communication with the satellite. The satellite gateway may be configured to receive ephemeris data for the satellite. The satellite gateway may be further configured to determine, using the ephemeris data and a location of the satellite gateway, a maximum distance and a minimum distance between the satellite and the satellite gateway during a time period when the satellite will be in line-of-sight communication with the satellite gateway. The satellite gateway may be further configured to determine, based on the maximum distance, a maximum propagation time for signals exchanged between the satellite and the satellite gateway during the time period. The satellite gateway may be further configured to determine, based on the minimum distance, a minimum propagation time for the signals exchanged between the satellite and the satellite gateway during the time period. The wireless network may further include a distributed unit located on Earth and in communication with the satellite gateway. The distributed unit may be configured to receive the minimum propagation time and the maximum propagation time from the satellite gateway. The distributed unit may be further configured to coordinate with the radio unit of the satellite, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

In some embodiments, the satellite gateway is further configured to determine, using the ephemeris data and the location of the satellite gateway, a first time when an elevation angle between the satellite gateway and the satellite will be at a predefined minimum elevation angle and determine that the time period will begin at the first time. In some embodiments, the predefined minimum elevation angle is greater than or equal to 10 degrees. In some embodiments, the satellite gateway is further configured to determine, using the ephemeris data and the location of the satellite gateway, a direction between the satellite gateway and the satellite at the first time and determine the predefined minimum elevation angle based on the direction. In some embodiments, the satellite gateway is further configured to determine, using the ephemeris data and the location of the satellite gateway, a second time after the first time when the elevation angle will be at the predefined minimum elevation angle and determine that the time period will end at the second time.

In some embodiments, the time period ends at an end time before the satellite reaches an upper culmination with respect to the satellite gateway. In some embodiments, the time period is a first time period, the minimum distance is a first minimum distance, the minimum propagation time is a first minimum propagation time, the satellite gateway is further configured to: determine, using the ephemeris data and the location of the satellite gateway, a second minimum distance between the satellite and the satellite gateway during a second time period that begins at the end time; and determine, based on the second minimum distance, a second minimum propagation time for second signals exchanged between the satellite and the satellite gateway during the second time period. In some embodiments, the distributed unit is further configured to: receive the second minimum propagation time from the satellite gateway; and coordinate with the radio unit of the satellite, via the satellite gateway, a second reception time frame during the second time period when the distributed unit will receive second uplink data from the radio unit of the satellite and a second transmission time frame during the second time period when the distributed unit will transmit second downlink data to the radio unit of the satellite using the first minimum propagation time and the second minimum propagation time.

In some embodiments, the distributed unit is configured to coordinate the first time frame and the second time frame by: measuring a minimum downlink latency and a maximum downlink latency for downlink signals transmitted from the distributed unit to the satellite gateway; combining the minimum downlink latency with the minimum propagation time and a maximum internal downlink delay for the radio unit of the satellite to determine an earliest time when the distributed unit will transmit the downlink data to the radio unit of the satellite; combining the maximum downlink latency with the maximum propagation time and a minimum internal downlink delay for the radio unit of the satellite to determine a latest time when the distributed unit will transmit the downlink data to the radio unit of the satellite; measuring a minimum uplink latency and a maximum uplink latency for uplink signals transmitted from the satellite gateway to the distributed unit; combining the minimum uplink latency with the minimum propagation time and a minimum internal uplink delay for the radio unit of the satellite to determine an earliest time when the distributed unit will receive the uplink data from the radio unit of the satellite; and combining the maximum uplink latency with the maximum propagation time and a maximum internal uplink delay for the radio unit to determine a latest time when the distributed unit will receive the uplink data from the radio unit of the satellite. In some embodiments, the distributed unit measures the minimum downlink latency, the maximum downlink latency, the minimum uplink latency, and the maximum uplink latency according to the enhanced Common Public Radio Interface (eCPRI) standard.

In some embodiments, a method of coordinating transmissions between terrestrial and non-terrestrial components of a wireless network is provided. The method may include receiving, by a satellite gateway, ephemeris data for a satellite. In some embodiments, the satellite comprises a radio unit. The method may further include determining, by the satellite gateway using the ephemeris data and a location of the satellite gateway, a maximum distance and a minimum distance between the satellite and the satellite gateway during a time period when the satellite will be in line-of-sight communication with the satellite gateway. The method may further include determining, by the satellite gateway, a maximum propagation time for signals exchanged between the satellite and the satellite gateway during the time period based on the maximum distance. The method may further include determining, by the satellite gateway, a minimum propagation time for the signals exchanged between the satellite and the satellite gateway during the time period based on the minimum distance. The method may further include providing, by the satellite gateway, the minimum propagation time and the maximum propagation time to a distributed unit. In response to receiving the minimum propagation time and the maximum propagation time, the distributed unit may coordinate with the radio unit, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

The method may further include determining, using the ephemeris data and the location of the satellite gateway, a first time when an elevation angle between the satellite gateway and the satellite will be at a predefined minimum elevation angle and determining that the time period will begin at the first time. In some embodiments, the predefined minimum elevation angle is greater than or equal to 10 degrees. The method may further include determining, using the ephemeris data and the location of the satellite gateway, a direction between the satellite gateway and the satellite at the first time and determining the predefined minimum elevation angle based on the direction. The method may further include determining, using the ephemeris data and the location of the satellite gateway, a second time after the first time when the elevation angle will be at the predefined minimum elevation angle and determining that the time period will end at the second time.

In some embodiments, the time period is a first time period that ends at an end time before the satellite reaches an upper culmination with respect to the satellite gateway, the minimum distance is a first minimum distance, the minimum propagation time is a first minimum propagation time, and the method further includes: determining, using the ephemeris data and the location of the satellite gateway, a second minimum distance between the satellite and the satellite gateway during a second time period that begins at the end time; determining, based on the second minimum distance, a second minimum propagation time for second signals exchanged between the satellite and the satellite gateway during the second time period; and providing the second minimum propagation time to the distributed unit. In response to receiving the second minimum propagation time, the distributed unit may coordinate with the radio unit of the satellite, via the satellite gateway, a second reception time frame during the second time period when the distributed unit will receive second uplink data from the radio unit of the satellite and a second transmission time frame during the second time period when the distributed unit will transmit second downlink data to the radio unit of the satellite using the first minimum propagation time and the second minimum propagation time.

The method may further include: measuring a minimum downlink latency and a maximum downlink latency for downlink signals transmitted from the distributed unit to the satellite gateway; combining the minimum downlink latency with the minimum propagation time and a maximum internal downlink delay for the radio unit of the satellite to determine an earliest time when the distributed unit will transmit the downlink data to the radio unit of the satellite; combining the maximum downlink latency with the maximum propagation time and a minimum internal downlink delay for the radio unit of the satellite to determine a latest time when the distributed unit will transmit the downlink data to the radio unit of the satellite; measuring a minimum uplink latency and a maximum uplink latency for uplink signals transmitted from the satellite gateway to the distributed unit; combining the minimum uplink latency with the minimum propagation time and a minimum internal uplink delay for the radio unit of the satellite to determine an earliest time when the distributed unit will receive the uplink data from the radio unit of the satellite; and combining the maximum uplink latency with the maximum propagation time and a maximum internal uplink delay for the radio unit to determine a latest time when the distributed unit will receive the uplink data from the radio unit of the satellite. In some embodiments, the minimum downlink latency, the maximum downlink latency, the minimum uplink latency, and the maximum uplink latency are measured according to the enhanced Common Public Radio Interface (eCPRI) standard.

In some embodiments, a satellite gateway is provided. The satellite gateway may include: one or more processors; and a memory connected to the one or more processors storing one or more computer-readable instructions which, when executed by the one or more processors, cause the one or more processors to receive ephemeris data for a satellite that comprises a radio unit and an antenna. The instructions may further cause the processors to determine, using the ephemeris data and a location of the satellite gateway, a maximum distance and a minimum distance between the satellite and the satellite gateway during a time period when the satellite will be in line-of-sight communication with the satellite gateway. The instructions may further cause the processors to determine, based on the maximum distance, a maximum propagation time for signals exchanged between the satellite and the satellite gateway during the time period. The instructions may further cause the processors to determine, based on the minimum distance, a minimum propagation time for the signals exchanged between the satellite and the satellite gateway during the time period. The instructions may further cause the processors to provide the minimum propagation time and the maximum propagation time to a distributed unit. In response to receiving the minimum propagation time and the maximum propagation time, the distributed unit may coordinate with the radio unit, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

In some embodiments, the one or more computer-readable instructions further cause the one or more processors to: determine, using the ephemeris data and the location of the satellite gateway, a first time when an elevation angle between the satellite gateway and the satellite will be at a predefined minimum elevation angle; and determine that the time period will begin at the first time. In some embodiments, the one or more computer-readable instructions further cause the one or more processors to: determine, using the ephemeris data and the location of the satellite gateway, a second time after the first time when the elevation angle will be at the predefined minimum elevation angle; and determine that the time period will end at the second time.

DETAILED DESCRIPTION

Figure 1:
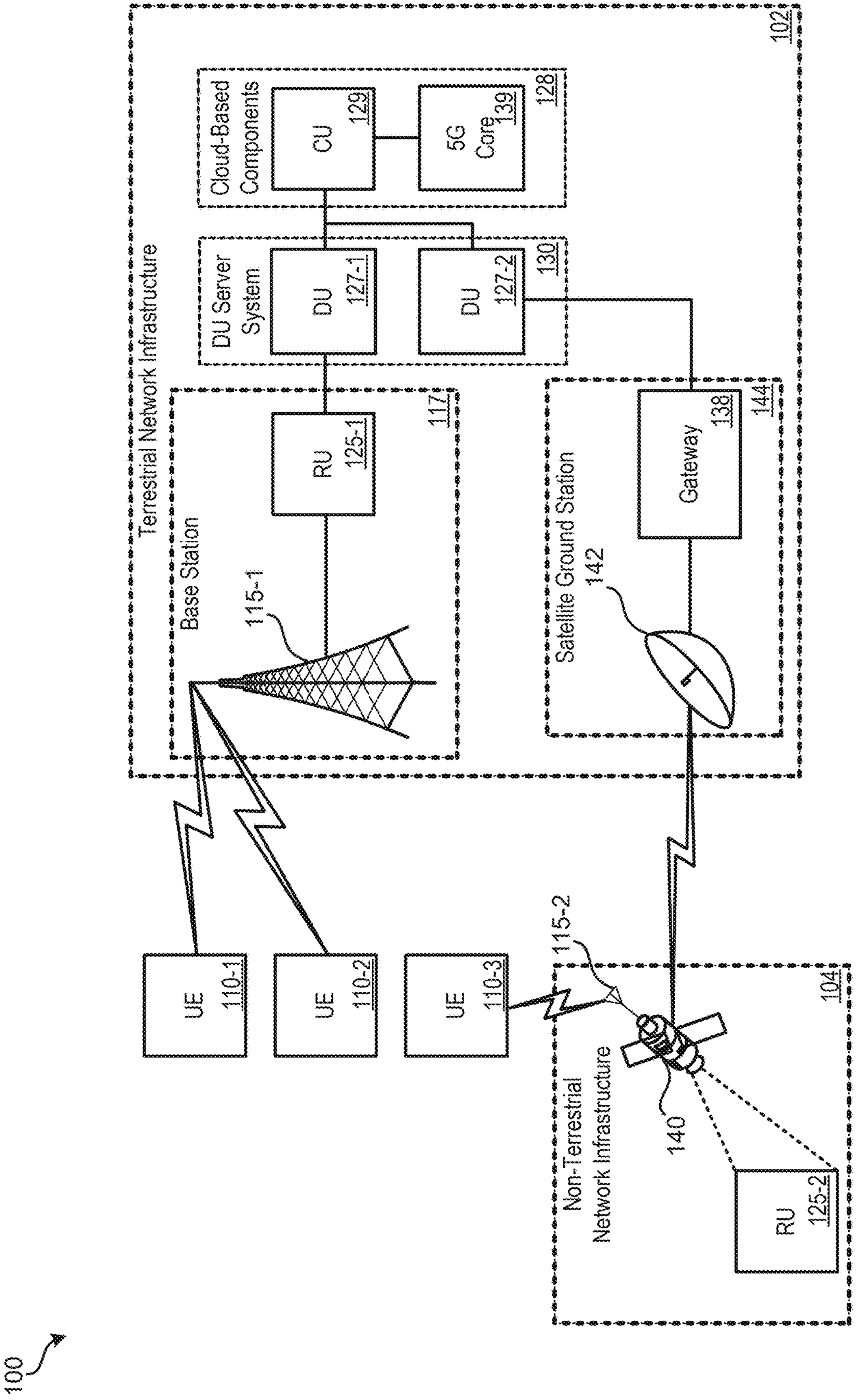
FIG. 1 illustrates an embodiment of a wireless network system, according to some embodiments of the present invention.

A traditional terrestrial-based radio access network (RAN) consists of several components, including one or more radio units (RUs), one or more distributed units (DUs), one or more centralized units (CUs), and user equipment (UE). RUs are typically located at base stations, which are strategically distributed to provide coverage over a geographical area. These RUs handle the radio frequency processing and communicate wirelessly with user devices, such as smartphones and tablets, using radio waves. Distributed units, which are often collocated with RUs, manage the real-time baseband processing and radio resource management, ensuring efficient data transmission, signal processing, and network synchronization between the RUs and a CU. Centralized units manage higher-layer protocols, orchestrate control and user plane function, and provide an interface between the DUs and the core network, facilitating overall network management and optimization. These components are interconnected through the fronthaul network, which links the RUs to the DUs, and the midhaul network, which connects the DUs to the CUS, and the backhaul network, which connects the CUs to the core network, where data processing, switching, and routing occur.

Despite their widespread use and robustness, terrestrial-based RANs have several shortcomings. One significant limitation is coverage, especially in rural, remote, or hard-to-reach areas, where deploying infrastructure is challenging and cost-prohibitive. Additionally, terrestrial networks can suffer from congestion in densely populated urban areas, leading to degraded service quality. The fixed nature of base stations also makes it difficult to provide consistent coverage in areas with varying demand, such as during large events or in regions with fluctuating populations. Furthermore, natural disasters and other disruptions can damage terrestrial infrastructure, causing prolonged outages and impacting communication services.

Integrating non-terrestrial (NTN) components, such as satellites, drones, and high-altitude platforms, into traditional terrestrial-based RANs can address these and other shortcomings. For example, satellites deployed with one or more RUs can provide broad coverage, reaching remote and rural areas where terrestrial infrastructure is lacking. They can also offer redundancy and resilience, ensuring communication continuity during natural disasters or infrastructure failures. As another example, drones and high-altitude platforms can be deployed quickly to provide temporary coverage in areas with sudden spikes in demand or in disaster-stricken regions. This hybrid approach enhances coverage, improves service quality, and increases the network's flexibility and resilience. By combining the strengths of both terrestrial and NTN components, mobile network operators can deliver more reliable and ubiquitous connectivity.

While such a split terrestrial and NTN fronthaul ("NTN-FH") network architecture may enhance the network reliability and coverage, doing so can introduces substantial challenges, particularly when attempting to synchronize clocks across the terrestrial and NTN components of the RAN. For example, in the case of a satellite in Low Earth Orbit (LEO), the distance between the satellite and the satellite gateway ("GW"), and therefore the propagation time for wireless signals exchanged between the two, is constantly changing. As a result, time synchronization messages exchanged between the satellite and GW could have different propagation delays, or latencies, for which many synchronization protocols cannot accurately account, leading to errors in time synchronization.

The varying propagation times between a GW and a satellite equipped with an RU, referred to herein as an "NTN-RU," can also impact the determination of transmit and receive time windows for both the NTN-RU and a terrestrial DU that is attempting to manage the operations of the NTN-RU through the GW. As precise timing is essential to avoid interference and ensure efficient data flow, inconsistent delays can lead to misalignment of these time windows, resulting in increased latency, reduced data throughput, and potential disruptions in service quality. Therefore, managing and compensating for the changing propagation times is important to maintaining the integrity and performance of the RAN.

Embodiments described herein solve these and other challenges associated with integrating NTN components, such as NTN-RUs, with terrestrial components, such as DUs, by providing novel adaptations of existing protocols and procedures for clock synchronization and transmit/receive window determinations that take the movement and/or position of the NTN components with respect to the GW into account.

Further detail regarding these and other embodiments is provided in relation to the figures. FIG. 1 illustrates an embodiment of wireless network system 100 ("system 100"). System 100 can include a 5G New Radio (NR) wireless network; other types of wireless networks, such as 6G, 7G, etc., may also be possible. System 100 can include: UE 110 (UE 110-1, UE 110-2, UE 110-3); antennas 115; radio units 125 ("RUs 225"); DUs 127; centralized unit 129 ("CU 129"); 5G core 139; satellite gateway 138; satellite 140; and satellite gateway antenna 142. FIG. 1 represents a component-level view of a wireless network that includes a split NTN-FH network architecture including: terrestrial network infrastructure 102 and non-terrestrial network infrastructure 104.

As illustrated, terrestrial network infrastructure 102 can include: antenna 115-1; RU 125-1; DUs 127; CU 129; 5G core 139; satellite gateway 138; and satellite antenna 142. As further illustrated, non-terrestrial network infrastructure 104 can include satellite 140, which in turn can include, or have installed thereon, RU 125-2 and antenna 115-2. Satellite 140 may be one of a constellation of satellites in Low Earth Orbit (LEO), each equipped with one or more RUs. Satellite 140 may include additional hardware and/or software interfaces, such as one or more antennas, modems, routers, switches, network interfaces, or the like, that enable satellite 140, and/or the components installed thereon, to communicate with one or more satellite gateways, such as satellite gateway 138, while they are in direct line-of-sight from satellite 140.

In an open radio access network (O-RAN), because components can be implemented as specialized software executed on general-purpose hardware, except for components that need to receive and transmit Radio Frequency (RF) signals, the functionality of the various components can be shifted among different servers. For at least some components, the hardware may be maintained by a separate cloud-service provider, to accommodate where the functionality of such components is needed, or a hybrid arrangement which can use an on-premises data center and cloud computing functionality.

UE 110 can represent various types of end-user devices, such as wireless phones, smartphones, wireless modems, wireless-enabled computerized devices, sensor devices, gaming devices, access points (APs), any computerized device capable of communicating via a wireless network, Internet of Things (IoT), etc. Generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various terrestrial base stations (BSs) of a wireless network, such as BS 117. BS 117 can include: antenna 115-1 and RU 125-1. Terrestrial base stations, such as BS 117, can be installed on stationary structures, such as a dedicated wireless tower, a building, a water tower, or any other man-made or natural structure to which one or more antennas, such as antenna 115-1, can reasonably be mounted to provide wireless coverage to a geographic area.

UE 110 may further use RF to communicate with various non-terrestrial BSs (NTN-BSs). NTN-BSs may include one or more types of mobile platforms, such as satellite 140. NTN-BSs may further include other types of mobile platforms, such as airplanes, drones, and other airborne vehicles. NTN-BSs may include the same or similar components integrated thereon as terrestrial BSs. For example, and as illustrated, satellite 140 may include RU 125-2 and antenna 115-2. An RU installed on, or otherwise integrated into a mobile platform, such as satellite 140, may be referred to herein as a non-terrestrial RU (NTN-RU). NTN-RUs, such as RU 125-2, may function in the same or similar way as RU 125-1, as described herein, to transmit user data between UE 110 and DUs 127. While described as including a single NTN-RU and antenna, NTN-BSs may include one or more NTN-RUs and corresponding antennas to support different cells, and/or different portions of the spectrum, for a geographic region. Furthermore, while illustrated and described as an NTN-RU in communication with a terrestrial DU, NTN-BSs may include both an NTN-RU and a non-terrestrial DU (NTN-DU), whereby the midhaul network is split between terrestrial and non-terrestrial components.

Real-world implementations of system 100 can include many (e.g., thousands) of terrestrial and non-terrestrial BSs. Antennas 115 may allow RUs 125 to communicate wirelessly with UEs 110. RUs 125 can represent an edge of the wireless network where user data is transitioned to RF for wireless communication to UE, and vice versa for RF received from UE. The radio access technology (RAT) used by RUs 125 may be 5G New Radio (NR), or some other RAT. The remainder of the wireless network may be based on an exclusive 5G architecture, a hybrid 4G/5G architecture, a 4G architecture, or some other wireless network architecture.

One or more RUs, such as RUs 125, may communicate with a DU, such as DU 127-1, via one or more routers. As an example, at a possible cell site or BS, three RUs may be present, each connected with, and managed by, the same DU. A single DU may further be connected to RUs at multiple cell sites or BSs. Different RUs may be present for different portions of the spectrum and/or different cells provided by a BS. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DUs 127, may communicate with CU 129. Collectively, an RU, DU, and CU create a gNodeB, which serves as the radio access network (RAN) of a wireless network. DUs 127 and CU 129 can communicate with 5G core 139.

The specific architecture of a wireless network can vary by embodiment. Further, the specific architecture of fronthaul (FH) networks, which link RUs to DUs, may vary within a wireless network architecture. FH network architectures can include terrestrial fronthaul (TN-FH) networks and split non-terrestrial fronthaul (NTN-FH) networks. TN-FH networks may include FH networks that have one or more terrestrial and/or fixed position RUs. For example, and as illustrated, the connection between RU 125-1 and DU 127-1 may be part of a TN-FH network. On the other hand, NTN-FH networks may include FH networks that have one or more non-terrestrial, or mobile, RUs. For example, RU 125-2, DU 127-2, and the intermediate links there between, may be parts of an NTN-FH network.

As further illustrated, a terrestrial gateway, such as satellite gateway 138, may act as a router or switch between a terrestrial DU, such as DU 127-2, and an NTN-RU, such as RU 125-2. Similar to the way in which RUs represent an edge of the wireless network where user data is converted to/from RF for wireless communications with UE, a terrestrial gateway may represent the terrestrial edge of an NTN-FH network where data from one or more DUs, such as user data, control and configuration data, synchronization information, or the like (collectively referred to as CUS-Plane data), is converted to/from RF for wireless communication with a non-terrestrial platform via one or more antennas. Additionally, or alternatively, a terrestrial gateway may act as a router or switch between a non-terrestrial DU and a terrestrial CU. In the case of satellite-based RUs, satellite gateways, such as satellite gateway 138, may be installed at a satellite ground station, such as satellite ground station 144, that includes one or more satellite antennas, such as satellite antenna 142, to communicate with one or more satellites in orbit around the Earth. While primarily described herein as a satellite gateway, other types of terrestrial gateways may be used to provide communication with other types of NTN platforms. For example, in the context of airborne NTN platforms, such as airplanes and/or Unmanned Aerial Vehicles (UAVs), the functions performed by terrestrial gateways described herein may be performed at and/or by a fixed and/or portable UAV Ground Control Station (GCS) or other ground stations designed for telecommunications with airborne playforms.

Satellite gateway 138 may communicate with one or more DUs, such as DU 127-2, and/or a DU server system, such as DU server system 130, via one or more physical connections and/or wired network connections. In some embodiments, the one or more DUs connected to a satellite gateway are located in a same facility as the satellite gateway. Additionally, or alternatively, the one or more DUs may be located in a local data center (LDC) in close geographic proximity to the satellite gateway. The geographic distance between the satellite gateway and the one or more DUs may be selected based on minimum latency requirements for communications between the one or more DUs and the NTN-RUs installed on satellites that will be managed by the one or more DUs through the satellite gateway.

As described above, terrestrial gateways, such as satellite gateway 138, may route fronthaul data (e.g., CUS-Plane data) between one or more DUs and one or more non-terrestrial platforms upon which non-terrestrial RUs are installed or otherwise integrated. Fronthaul data may include: the actual data being transmitted by end-users, such as voice, video, and internet traffic; signaling information used to manage an RU, including resource control messages and scheduling information; settings and parameters necessary for the operation of an RU, such as carrier frequencies, power levels, and antenna configurations; or the like.

Terrestrial gateways, such as satellite gateway 138, may also provide satellite link data to one or more DUs, such as DU 127-2. Satellite link data may refer to the information related to the communication link between the satellite gateway and a satellite. For example, satellite link data may include the distance and/or signal propagation time between a satellite gateway and a satellite at one or more points in time during a satellite's upcoming or current visibility window. As used herein, the visibility window for a satellite is the period of time during which the satellite is within the line of sight of a satellite antenna through which a satellite gateway communicates with the satellite.

In some embodiments, satellite gateways, such as satellite gateway 138, use ephemeris data for a satellite to determine the distance and/or signal propagation time between the satellite and a satellite gateway at a known location for a given point in time. Ephemeris data for a satellite can include the precise positions, velocities, and trajectories at specific times, along with additional information such as the satellites orbital parameters and predicted future positions. Ephemeris data for a satellite can be received from satellite broadcasts, ground control stations, and space agencies, such as the National Aeronautics and Space Administration (NASA), the North American Aerospace Defense Command (NORAD), and the United States Space Command.

Given a specific point in time and the ephemeris data for a satellite, the coordinates of the satellite at that point in time may be determined. The coordinates of the satellite and/or the coordinates of the satellite antenna may then be converted into a common coordinate system. The common coordinate system may be a geocentric Cartesian coordinate system, such as the Earth-Centered, Earth-Fixed (ECEF) coordinate system, a Geographic Coordinate System (GCS), such as the World Geodetic System 1984 (WGS 84), or the like. Once the coordinates for the satellite and satellite antenna are determined and in a common coordinate system, a vector between the two coordinates may be determined and transformed into a topocentric reference frame centered at the location the satellite antenna. The transformed vector may be used to determine the elevation angle, azimuth, and distance between the satellite antenna and the satellite at the given point in time. Given the distance and the speed of light, the propagation time for a signal transmitted or received by the satellite at the point in time may be determined.

In some embodiments, satellite gateways, such as satellite gateway 138, determine the distance and/or signal propagation time for multiple points in time during a satellite's visibility window. For example, satellite gateway 138 may determine the distances and/or propagation times for when the elevation angle from the satellite antenna to the satellite will be at a minimum and a maximum for a given visibility window or pass. In some embodiments, the minimum elevation angle is a predefined minimum elevation angle greater than zero based on the environmental surroundings of the satellite antenna. Additionally, or alternatively, a minimum rising elevation angle and a minimum setting elevation angle may be defined for the beginning and ending elevation angles within a visibility window.

In some embodiments, minimum and maximum distances and/or signal propagation times may be determined for multiple time periods within a given visibility window. A visibility window may be sub-divided into multiple time periods of equal or varying lengths. For example, a 12 minute-long visibility window during which a satellite will be in a satellite antenna's line-of-sight can be divided into six time periods of two-minutes each. For each time period, the minimum and maximum distance and/or signal propagation time may be determined.

As described further herein, DUs, such as DU 127-2, may use the minimum and maximum propagation times between a satellite, such as satellite 140, and a satellite gateway, such as satellite gateway 138, to coordinate the transmit and receive windows for an RU installed on the satellite. For example, DU 127-2 may supplement the minimum and maximum uplink and downlink latencies of the terrestrial portions of the FH network, as well as the internal uplink and downlink delays of the RU, with the minimum and maximum propagation times to determine total minimum propagation times for uplink and downlink transmissions between DU 127-2 and RU 125-2, as well as total maximum propagation times for uplink and downlink transmissions. Based on the total minimum and maximum propagation times for both uplink and downlink transmissions, DU 127-2 may then determine an earliest and latest time between which it can transmit data to RU 125-2 for transmission to UE 110-3, as well as an earliest and latest time between which it will receive data from RU 125-2. Likewise, RU 125-2 may use the total minimum and maximum propagation times to determine an earliest and latest time when it can transmit data from UE 110-3 to DU 127-2, as well as an earliest and latest time when it can receive data from DU 127-2 for transmission to UE 110-3.

In some embodiments, a terrestrial gateway, such as satellite gateway 138, acts as, or performs the functions of, a telecom Grandmaster (t-GM) or telecom Boundary Clock (t-BC) within an NTN-FH. For example, acting as a t-GM, satellite gateway 138 may synchronize its internal clock to a reference time (e.g., via a GPS signal) and then synchronize internal clocks of DU 127-2 and RU 125-2 to its internal clock. Acting as a t-BC, satellite gateway 138 may be synchronized to the internal clock of DU 127-2 acting as t-GM, and subsequently synchronize the internal clock of RU 125-2 to the internal clock of satellite gateway 138. As further described herein, satellite gateways, such as satellite gateway 138, may use the distance and/or propagation times between a satellite and the satellite gateway to ensure accurate synchronization between the internal clock of an RU installed on the satellite, the internal clock of the satellite gateway, and by proxy, the internal clock of the DU configured to manage the RU.

Satellite gateway 138 may include one or more special purpose or general purpose computers and/or a server system equipped with various software components. The various software components of satellite gateway 138 may be designed to manage signal processing, data conversion, and timing synchronization between DU 127-2 and RU 125-2 to ensure accurate and efficient transmission of user data, control signals, configuration parameters, and synchronization information. For example, While FIG. 1 illustrates various components of a wireless network, other embodiments can vary the arrangement, communication paths, and specific components. While RUs 125 may include specialized radio access componentry to enable wireless communication with UE 110, other components of the wireless network may be implemented using either specialized hardware, specialized firmware, and/or specialized software executed on a general-purpose server system. In an O-RAN arrangement, specialized software on general-purpose hardware may be used to perform the functions of components such as DUs 127, CUs 129, and 5G core 139. As such, functionality of components such as DUs and CUs can be co-located or distributed across disparate physical server systems. For example, certain components of 5G core 139 may be co-located with components of CUs 129.

As illustrated, DUs 127 may be executed by DU server system 130. DU server system 130 may include one or more physical and/or virtual machines configured to execute some or all of the functions of DUs 127. For example, DU server system 130 may include a cluster of one or more physical servers. Specialized software that performs the logical functions of one or more DUs, such as DUs 127, may be executed directly by the operating system of the one or more physical servers. Additionally, or alternatively, a cluster of one or more virtual machines may be instantiated across the cluster of one or more physical servers. The specialized software that performs the logical functions of the one or more DUs may then be installed within, and executed by, the virtual machines.

In a possible O-RAN implementation, DUs 127, CU 129, and/or 5G core 139 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, the physical machines of DU server system 130 may be located at or near the one or more BSs for which they are intended to support, such as BS 117.

In some embodiments, the distance between a DU server system and the one or more BSs is selected to ensure that the transmission time between the DU server system and any of the BSs for which it is intended to provide DU functionalities meets minimum latency requirements. As another example, some functions of a CU may be located at a same server facility as DU server system 130, while other functions are executed at a separate server system or on a public or private cloud computing system.

In the illustrated embodiment of system 100, cloud-based wireless network components 128 include CU 129 and 5G core 139. Such cloud-based wireless network components 128 may be executed as specialized software executed by underlying general-purpose computer servers. Cloud-based wireless network components 128 may be executed on a third-party cloud-based computing platform or a cloud-based computing platform operated by the same entity that operates the RAN. A cloud-based computing platform may have the ability to devote additional hardware resources to cloud-based wireless network components 128 or implement additional instances of such components when requested.

Figure 2:
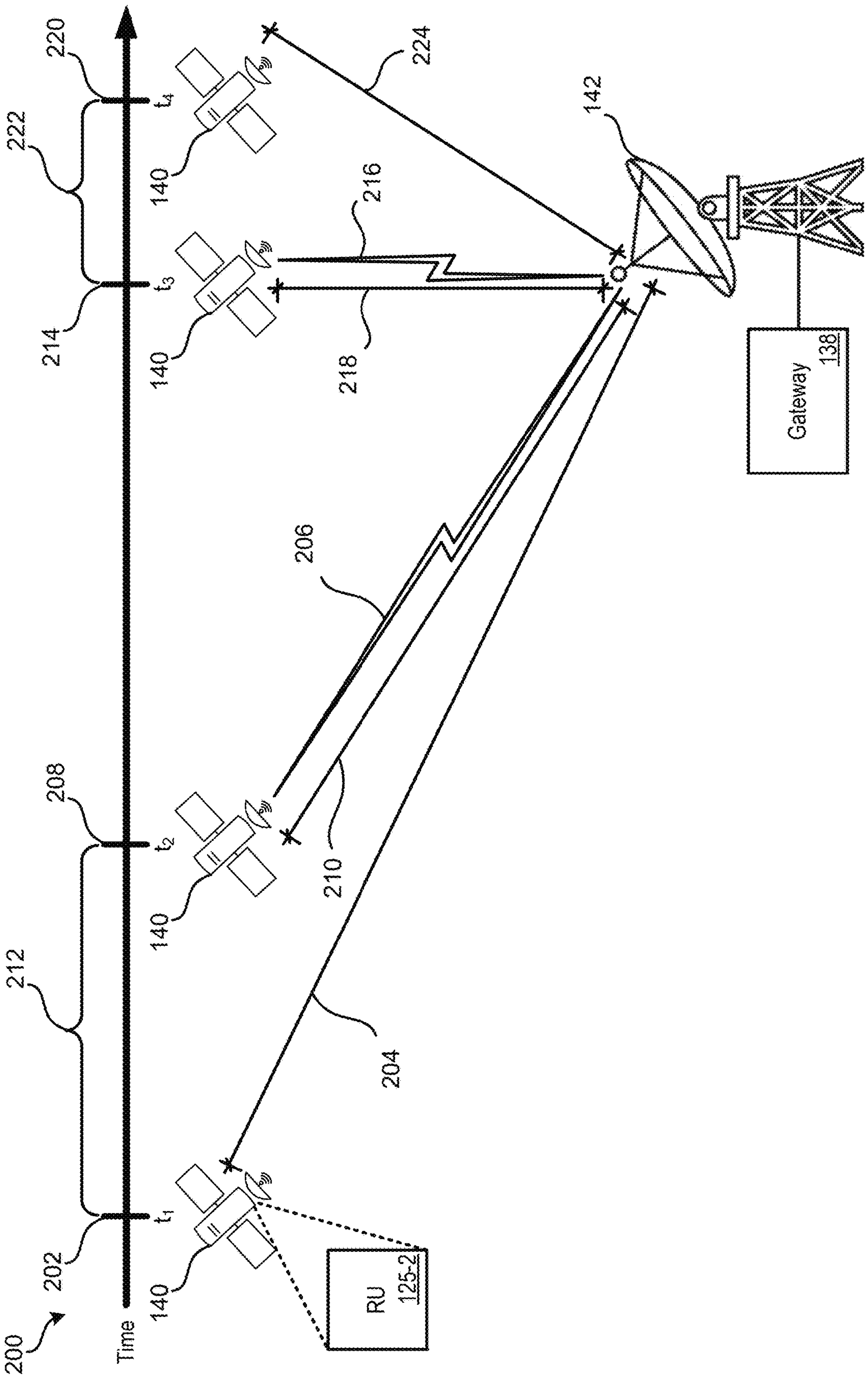
FIG. 2 illustrates the varying distances between a non-terrestrial RU and a satellite gateway at different points of a clock synchronization sequence, according to some embodiments of the present invention.

FIG. 2 illustrates the varying distances between a satellite-based network component and a satellite gateway at different points of a clock synchronization sequence ("sequence 200"). As illustrated, sequence 200 may be performed between satellite gateway 138 and RU 125-2 installed on satellite 140. However, it should be understood that sequence 200 could be adapted to synchronize the clocks of other non-terrestrial components, such as an NTN-DU, with the clocks of terrestrial components. Sequence 200 may include all, or a subset of steps from one or more clock synchronization protocols, such as the Precision Time Protocol (PTP) defined in the Institute of Electrical and Electronics Engineers (IEEE) 1588 standard, or other similar synchronization protocols by which timestamped messages are exchanged between the primary, reference, or leader clock and the secondary, synchronized, or follower clock.

As illustrated, sequence 200 begins with the transmission of "Sync" 206 from satellite gateway 138 to satellite 140 for processing by RU 125-2. Sync 206 may be transmitted at a first time ("$t_1$ 202") and received at a second time ("$t_2$ 208"). Sync 206 may include a first timestamp ("$ts_1$") generated by an internal clock of satellite gateway 138 at $t_1$ 202 when it is transmitted from satellite gateway 138. Additionally, or alternatively, $ts_1$ may be included in a Follow_Up message transmitted from satellite gateway 138 after transmitting Sync 206. An internal clock of RU 125-2 may generate a second timestamp ("$ts_2$") at $t_2$ 208 when Sync 206 is received by RU 125-2. Subsequently, RU 125-2 may proceed to transmit "Delay_Req" 216 to satellite gateway 138. Delay_Req 216 may be transmitted at a third time ("$t_3$ 214") and received at a fourth time ("$t_4$ 220") at the satellite gateway. Delay_Req 216 may include a third timestamp ("$ts_3$") generated by the internal clock of RU 125-2 at time $t_3$ 214 when it is transmitted by RU 125-2. The internal clock of satellite gateway 138 may generate a fourth timestamp ("$ts_4$") at $t_4$ 220 when it is received by satellite gateway 138.

While not illustrated, sequence 200 may proceed with the transmission of a "Delay_Resp" message from satellite gateway 138 to RU 125-2 that includes the fourth timestamp $ts_4$. Once received, RU 125-2 may use each of the four timestamps to determine a clock offset between the internal clock of RU 125-2 and the internal clock of satellite gateway 138. In an ideal environment, such as when there is a direct wired connection between a primary clock and a secondary clock, the secondary clock can determine the clock offset by using the formula $((ts_2-ts_1)-(ts_4-ts_3))/2$, which assumes that the propagation delays for the Sync and Delay_Req messages are equal. If the propagation delays are not equal, this can cause the offset calculation to be skewed, as the formula relies on symmetric delays to cancel out the propagation time and isolate the true offset between the primary and secondary clocks.

In typical networking environments, where the locations of the primary and secondary clocks are static, unequal propagation times may be due to variations in network congestion or differing network paths taken by each message. In the case of a terrestrial primary clock and a non-terrestrial and/or mobile secondary clock, unequal propagation times may further occur due to the different propagation distance traveled by each message. For example, and as illustrated, first propagation distance 210 between satellite 140 and satellite gateway 138 when Sync 206 is received at $t_2$ 208 by satellite 140, and second propagation distance 218 between satellite 140 and satellite gateway 138 when Delay_Req 216 is transmitted by satellite 140 at $t_3$ 214 may be unequal due to the movement of satellite 140 between $t_2$ 208 and $t_3$ 214. As a result, first propagation time 212 for Sync 206 and second propagation time 222 for Delay_Req 216 will also be different.

As described above in relation to typical networking environments, the clock offset calculations can be adjusted to account for the unequal propagation and/or processing times by including a correction factor in the messages transmitted from the primary clock to the secondary clock. Some clock synchronization protocols, such as PTP, include a predefined field for the correction factor in both the Sync and Delay_Resp messages. This correction field allows the primary clock to communicate any known delays and processing times to the secondary clock, which can then incorporate these values into its offset calculation. For example, given correction factors in the Sync ("$Correction_{Sync}$") and Delay_Resp ("$Correction_{DelayResp}$") messages, the original formula of $((ts_2-ts_1)-(ts_4-ts_3))/2$ for calculating the clock offset may be modified to $[ts_2-(ts_1+Correction_{Sync})+ts_3-(ts_4-Correction_{DelayResp})]/2$, where $Correction_{Sync}$ compensates for delays from the primary clock to the secondary clock when sending the Sync message, and Correction DelayResp compensates for delays from the secondary clock to the primary clock when sending the Delay_Req message. By accounting for these additional delays, the secondary clock can more accurately adjust its time to match the primary clock, thereby improving synchronization accuracy even in the presence of asymmetric network delays.

To account for the differences between first propagation time 212 and second propagation time 222 when the final clock offset is calculated by RU 125-2 of satellite 140, the correction field in Sync 206, Follow_Up, and/or Delay_Resp 216 can be adjusted. In some embodiments, the correction field in Sync 206, or a Follow_Up message, is adjusted to include the value of first propagation time 212, and the correction field in Delay_Resp 216 is adjusted to include the value of second propagation time 222. Additionally, or alternatively, the correction field in Sync 206 may be left unchanged and the correction field in Delay_Resp 216 may be adjusted to include the difference between second propagation time 222 and first propagation time 212 (i.e., second propagation time 222 minus first propagation time 212). Including the difference between second propagation time 222 and first propagation time 212 in the correction field of Delay_Resp 216 may allow satellite gateway 138 to use the actual time of $t_1$ when determining first propagation time 212 rather than estimating the propagation time based on a predicted $t_1$ so that it can be included in Sync 206, thereby avoiding additional delays in the transmission of Sync 206.

In some embodiments, first propagation time 212 and second propagation time 222 are calculated based on the actual propagation distance of Sync 206 and Delay_Req 216, or first propagation distance 210 and second propagation distance 218, respectively. Additionally, or alternatively, first propagation time 212 and second propagation time 222 may be approximated from first distance 204 at time $t_1$ 202 when Sync 206 is transmitted by satellite gateway 138 and second distance 224 at time $t_4$ 220 when Delay_Req 216 is received by satellite gateway 138. Due to the relative differences in the speed of light (~300,000 kilometers per second) and the speed of satellites in LEO (~7.8 kilometers per second), the amount of error (e.g., the difference between actual and approximate propagation times) introduced by such an approximation can be on the order of a few tens of nanoseconds. Thus, in instances where this amount of error is acceptable, the propagation times may be approximated to reduce additional computations associated with calculating the location of satellite 140 at $t_2$ 208 and $t_3$ 214 using only $t_1$ 202 and $t_4$ 220.

As described above, adapting the existing correction field of standardized clock synchronization messages transmitted to satellite 140 can reduce the need for excess processing on, or modifications to, the hardware and/or software components installed on satellite 140. For example, and as demonstrated above, by determining the propagation times at satellite gateway 138 and adjusting the value in the correction field of the Delay_Resp message to satellite 140 accordingly, the synchronization steps performed at satellite 140 can remain unchanged. While described above in reference to satellite platforms, similar procedures can be applied to other non-terrestrial platforms, such as drones or airplanes. For example, rather than using ephemeris data, GPS data for an airborne platform at $t_2$ 208 and $t_3$ 214 can be used to calculate first propagation time 212 and second propagation time 222, which may then be provided in the correction field of the Delay_Resp message transmitted to the airborne platform.

Figure 3:
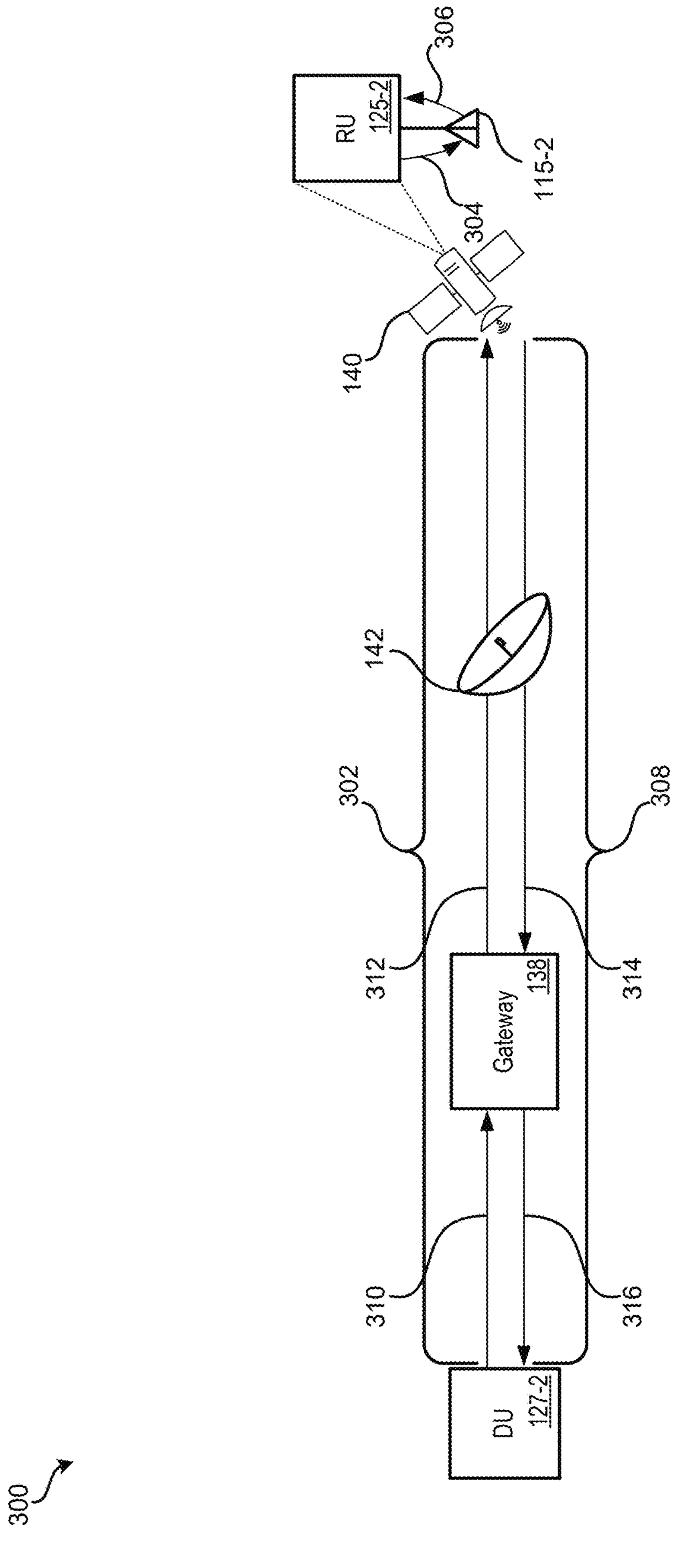
FIG. 3 illustrates the propagation of uplink and downlink signals across a split terrestrial and non-terrestrial fronthaul network, according to some embodiments of the present invention.

FIG. 3 illustrates the propagation of uplink and downlink signals across a split terrestrial and non-terrestrial fronthaul network 300. Fronthaul network 300 includes DU 127-2, satellite gateway 138, satellite antenna 142, satellite 140, RU 125-2, and antenna 115-2. As described above, fronthaul delay management is a critical aspect of ensuring the efficient and reliable operation of a RAN, particularly in configurations involving separated RUs and DUs. This process involves monitoring, compensating for, and minimizing the delays that occur in the transmission of data between RUs and DUs over the fronthaul network. Effective fronthaul delay management ensures that data packets are delivered within the precise timing windows necessary for synchronized operations, which is essential for maintaining low latency, high data throughput, and overall network performance.

To achieve this, the network must determine the earliest and latest times at which messages can be transmitted so that they arrive within the designated receive window. This involves calculating the maximum and minimum propagation delays for each uplink and downlink segment of the fronthaul network. As illustrated, the minimum and maximum propagation delays may be calculated for: downlink transport 302, which measures the transport network delay of a data packet from DU 127-2 to RU 125-2; downlink transmission 304, which measures timing difference between the reception of a data packet at RU 125-2 and the transmission of IQ samples at antenna 115-2; uplink receipt 306, which measures the timing difference between the reception of IQ samples at antenna 115-2 and the transmission of a corresponding data packet to DU 127-2; and uplink transport 308, which measures the transport network delay of a data packet from RU 125-2 to DU 127-2. The minimum and maximum propagation times for downlink transmission 304 and uplink receipt 306 may be specified by the vendor of RU 125-2. In terrestrial fronthaul networks, the enhanced Common Public Radio Interface (eCPRI) protocol may be used to determine the minimum and maximum propagation delays for downlink transport 302 and uplink transport 308.

In split terrestrial and non-terrestrial fronthaul networks, such as fronthaul network 300, downlink transport 302 may be divided into terrestrial downlink transport 310, which measures the delay of a data packet from DU 127-2 to satellite gateway 138, and feeder link downlink transport 312, which measures the delay of a data packet from satellite gateway 138 to satellite 140 for receipt by RU 125-2. Similarly, uplink transport 308 may be divided into feeder link uplink transport 314, which measures the delay of a data packet from satellite 140 to satellite gateway 138, and terrestrial uplink transport 316, which measures the delay of a data packet from satellite gateway 138 to DU 127-2.

As is the case for terrestrial fronthaul networks, the eCPRI protocol may be used to determine the minimum and maximum propagation delays for terrestrial downlink transport 310 and terrestrial uplink transport 312. On the other hand, the minimum and maximum propagation delays for feeder link downlink transport 312 and feeder link uplink transport 314 may be calculated by satellite gateway 138 and provided to DU 127-2 based on maximum and minimum distances between satellite 140 and satellite gateway 138 during a given visibility window.

Once received, DU 127-2 may combine the maximum and minimum propagation delays for terrestrial downlink transport 310 with the maximum and minimum propagation times between satellite 140 and satellite gateway 138 to determine the maximum and minimum propagation times for downlink transport 302. Likewise, DU 127-2 may combine the maximum and minimum propagation delays for terrestrial uplink transport 316 with the maximum and minimum propagation times between satellite 140 and satellite gateway 138 to determine the maximum and minimum propagation times for uplink transport 308.

To determine the earliest time when DU 127-2 will transmit downlink data to RU 125-2, DU 127-2 may combine the minimum propagation time for downlink transport 302 with the maximum propagation time for downlink transmission 304. To determine the latest time when DU 127-2 will transmit downlink data to RU 125-2, DU 127-2 may combine the maximum propagation time for downlink transport 302 with the minimum propagation time for downlink transmission 304. Likewise, to determine the earliest time when DU 127-2 will receive uplink data from RU 125-2, DU 127-2 may combine the minimum propagation time for uplink transport 308 with the minimum propagation time for uplink receipt 306, and to determine the latest time when DU 127-2 will receive uplink data from RU 125-2, DU 127-2 may combine the maximum propagation time for uplink transport 316 with the maximum propagation time for uplink receipt 306.

Figure 4:
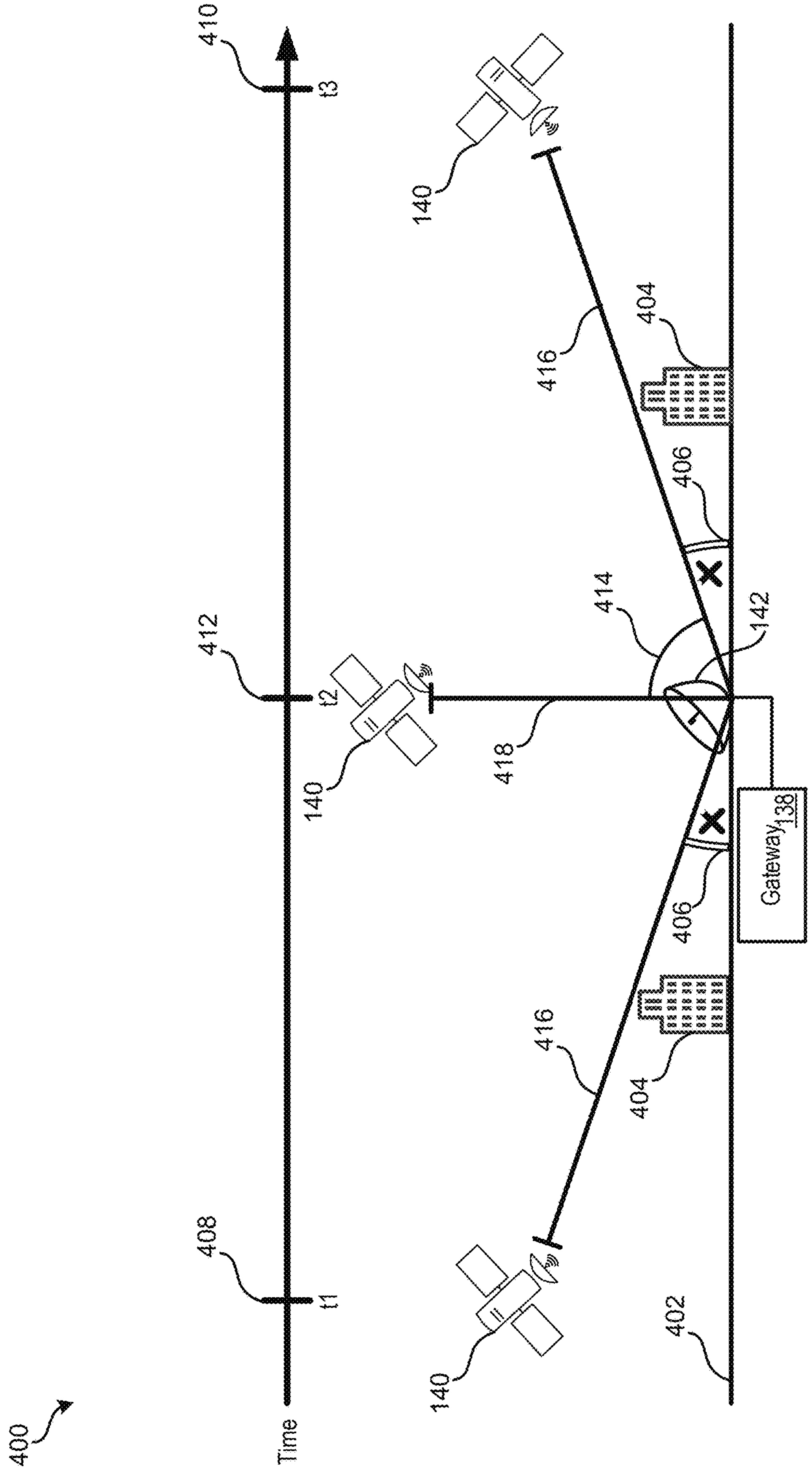
FIG. 4 illustrates minimum and maximum distances between a satellite and a satellite antenna during a visibility window, according to some embodiments of the present invention.

In some embodiments, the minimum and maximum propagation times between satellite 140 and satellite gateway 138, are calculated once for each time that the satellite will be visible to satellite gateway 138, otherwise referred to herein as a visibility window or pass. FIG. 4 illustrates minimum and maximum distances between satellite 140 and satellite antenna 142 of satellite gateway 138 during visibility window 400.

In a flat environment with no physical obstructions between a satellite antenna and the horizon when the elevation angle of the satellite antenna is zero degrees, a satellite visibility window begins when the satellite rises above the horizon as seen by the satellite antenna and ends when the satellite sets below the horizon. This means the satellite becomes visible to the satellite antenna when the satellite antenna's elevation angle is at a minimum elevation angle of approximately 0 degrees as it moves above the flat horizon and remains visible until it descends below the horizon when the satellite antenna's elevation angle is approximately 0 degrees again. During this visibility window, the satellite will be furthest from the satellite antenna when it first rises above and when it sets below the horizon. The satellite will be closest to the satellite antenna at the upper culmination of the satellite's pass when it reaches its highest point in the sky from the perspective of the satellite antenna. At the upper culmination, the satellite antenna's elevation angle will be greater than the minimum elevation angle and less than or equal to approximately 90 degrees depending on the satellite's trajectory across the sky from the perspective of the satellite antenna.

In environments that are not flat or have physical obstructions between the satellite antenna and the horizon, the visibility window is affected by these additional factors. As such, the visibility window may begin when the satellite rises above the local terrain or obstructions, which may require a higher elevation angle for the satellite antenna than 0 degrees, and the visibility window may end when the satellite descends below the line of sight of the satellite antenna, which may again require a higher elevation angle for the satellite antenna than 0 degrees. Consequently, the actual visibility window in such environments is shorter and starts and ends at higher elevation angles for the satellite antenna compared to a flat, unobstructed setting.

For example, and as illustrated, the view of horizon 402 from satellite antenna 142 of satellite gateway 138 may be obstructed by one or more buildings 404. This may be the case when satellite antenna 142 is located in an urban or suburban region. As a result, minimum elevation angle 406 at which satellite antenna 142 of satellite gateway 138 will be able to establish direct line of sight communication with satellite 149 may be greater than 0 degrees. In some embodiments, minimum elevation angle 406 for satellite antenna 142 is predefined for all azimuth angles to avoid common environmental obstructions, such as buildings, trees, mountains, or the like, ensuring a clear line-of-sight to a satellite. For example, minimum elevation angle 406 may be predefined as 10 degrees, 15 degrees, 20 degrees, or the like, depending on typical installation environments for satellite antenna 142. Additionally, or alternatively, minimum elevation angle 406 may be predefined for all azimuth angles based on the minimum elevation angle required to establish direct line-of-sight communication with a satellite over a known obstruction from the location of satellite antenna 142. In either case, defining a minimum elevation angle for all azimuth angles may ensure that, for an entire visibility window, the maximum distance from the satellite to the satellite antenna is the same at both ends of the window.

As further described above, ephemeris data for satellite 140 can be used to determine when visibility window 400 will begin and end. For example, and as illustrated, satellite gateway 138 may determine that satellite 140 will become visible at start time 408 when the angle between satellite antenna 142 of satellite gateway 138 and satellite 140 is equal to or greater than minimum elevation angle 406, and will no longer be visible at end time 410 when the angle is less than or equal to minimum elevation angle 406. Satellite gateway 138 may further determine that satellite 140 will reach an upper culmination at mid-point time 412 when the elevation angle between satellite antenna 142 of satellite gateway 138 and satellite 140 is at maximum elevation angle 414 for visibility window 400.

Based on the start, end, and midpoint times of visibility window 400, the ephemeris data for satellite 140 can be used to determine the maximum and minimum distances between satellite 140 and satellite antenna 142 of satellite gateway 138 during visibility window 400. For example, and as illustrated, satellite gateway 138 may use start time 408 and/or end time 410 to determine maximum distance 416 between satellite 140 and satellite antenna 142 of satellite gateway 138 during visibility window 400. Satellite gateway 138 may further use mid-point time 412 to determine minimum distance 418 between satellite 140 and satellite antenna 142 of satellite gateway 138 during visibility window 400.

As further described above, given maximum distance 416 and minimum distance 418 between satellite 140 and satellite antenna 142 of satellite gateway 138 during a visibility window, such as visibility window 400, the maximum and minimum propagation times for uplink and downlink signals between satellite 140 and satellite gateway 138 may be determined and combined with the minimum and maximum propagation times for the terrestrial components of the downlink and uplink paths. For example, satellite gateway 138 may provide the maximum and minimum propagation times for uplink and downlink signals between satellite 140 and satellite gateway 138 to a DU, such as DU 127-2. The DU may then use the maximum and minimum propagation times for uplink and downlink signals between satellite 140 and satellite gateway 138 to coordinate reception and transmission time frames with an RU installed on satellite 140.

Figure 5:
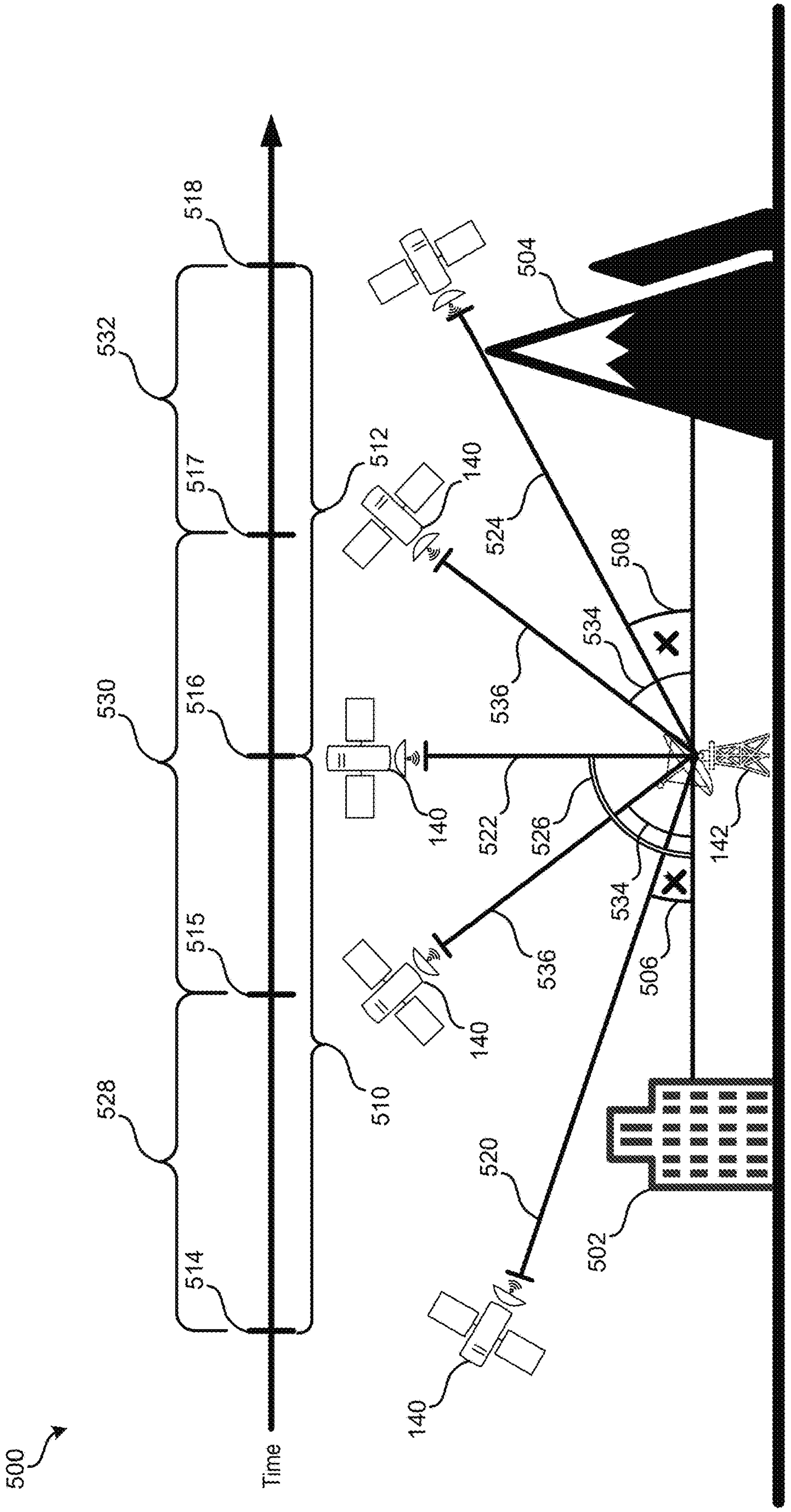
FIG. 5 illustrates minimum and maximum distances between a satellite and a satellite antenna for multiple time periods during a visibility window, according to some embodiments of the present invention.

While visibility window 400 is illustrated and described as having a single minimum and maximum distance between satellite 140 and satellite antenna 142, additional minima and maxima may be determined for multiple time periods within a given visibility window. FIG. 5 illustrates minimum and maximum distances between satellite 140 and satellite antenna 142 for multiple time periods during visibility window 500. Dividing a visibility window for a satellite pass, such as visibility window 500, into multiple time periods may allow for higher-fidelity minimum and maximum propagation time determinations for each time period compared to a single minimum and maximum propagation time determination for the entire visibility window.

Dividing a visibility window into multiple time periods may help account for different minimum elevation angles for a satellite antenna depending on the direction in which the satellite antenna will be pointing at the beginning and end of a visibility window. For example, and as illustrated, building 502 may obstruct the view of the horizon from satellite antenna 142 in a first direction and mountain 504 may obstruct the view of the horizon from satellite antenna 142 in a second direction. Accordingly, first minimum elevation angle 506 may be defined for satellite antenna 142 when it is pointing in the first direction and second minimum elevation angle 508 may be defined for satellite antenna 142 when it is pointing in the second direction.

Based on the difference between first minimum elevation angle 506 and second minimum elevation angle 508, visibility window 500 may be divided into two time periods, rising time period 510 and setting time period 512. Rising time period 510 may begin when satellite 140 becomes visible to satellite antenna 142 above building 502 at start time 514 when the elevation angle is greater than or equal to first minimum elevation angle 506, and end at mid-point time 516 when satellite 140 reaches the upper culmination of the pass with respect to satellite antenna 142 and the elevation angle of satellite antenna 142 is at maximum pass angle 526. Setting time period 512 may then begin at mid-point time 516 and end when satellite 140 disappears from view behind mountain 504 at end time 518 when the elevation angle is less than or equal to second minimum elevation angle 508. As described above, the minimum and maximum propagation times for rising time period 510 and setting time period 512 may then be determined based on maximum rising distance 520, minimum distance 522, and maximum setting distance 524 at start time 514, mid-point time 516, and end time 518, respectively.

In some embodiments, visibility windows are divided into three or more time periods to provide even greater fidelity for the minimum and maximum propagation times within each time period. For example, and as further illustrated, visibility window 500 may be divided into beginning time period 528, middle time period 530, and ending time period 532. Beginning time period 528 may have the same start time 514, first minimum elevation angle 506, and maximum rising distance 520 as rising time period 510 described above. Likewise, ending time period 532 may have the same end time 518, second minimum elevation angle 508, and maximum setting distance 524 as setting time period 512 described above. However, beginning time period 528 may end at rising mid-point time 515 before satellite 140 reaches the upper culmination when satellite antenna 142 is at mid-point elevation angle 534, and ending time period 532 may begin at setting mid-point time 517 after satellite 140 reaches the upper culmination when satellite antenna 142 returns to mid-point elevation angle 534. In the example of three time periods, mid-point elevation angle 534 may be selected from the range of angles between maximum pass angle 526 and the greater of: first minimum elevation angle 506 and second minimum elevation angle 508. With additional time periods, multiple different mid-point elevation angles may be selected.

In the illustrated example, mid-point distance 536 at rising mid-point time 515 and/or setting mid-point time 517 may be used to determine the minimum propagation times for beginning time period 528 and ending time period 532. Mid-point distance 536, and therefore the minimum propagation time for beginning time period 528 and/or ending time period 532, may be used for the maximum distance, and therefore maximum propagation time, for middle time period 530. Minimum distance 522 may be used to determine the minimum propagation time for middle time period 530.

In some embodiments, the number and/or size of each time period within a visibility window for a satellite are selected based on the minimum and maximum elevation angles for the satellite antenna and/or the length of the visibility window. For example, given a minimum and maximum elevation angle for the satellite antenna during a particular visibility window (e.g., 0 degrees and 90 degrees), the visibility window may be divided into time periods corresponding to predefined ranges of elevation angles (e.g., from 0 to 5 degrees, 5 to 10 degrees, etc.). As another example, a visibility window may be divided into multiple time periods with predefined lengths, such as every 5 minutes, 10 minutes, or 15 minutes of the visibility window.

Figure 6:
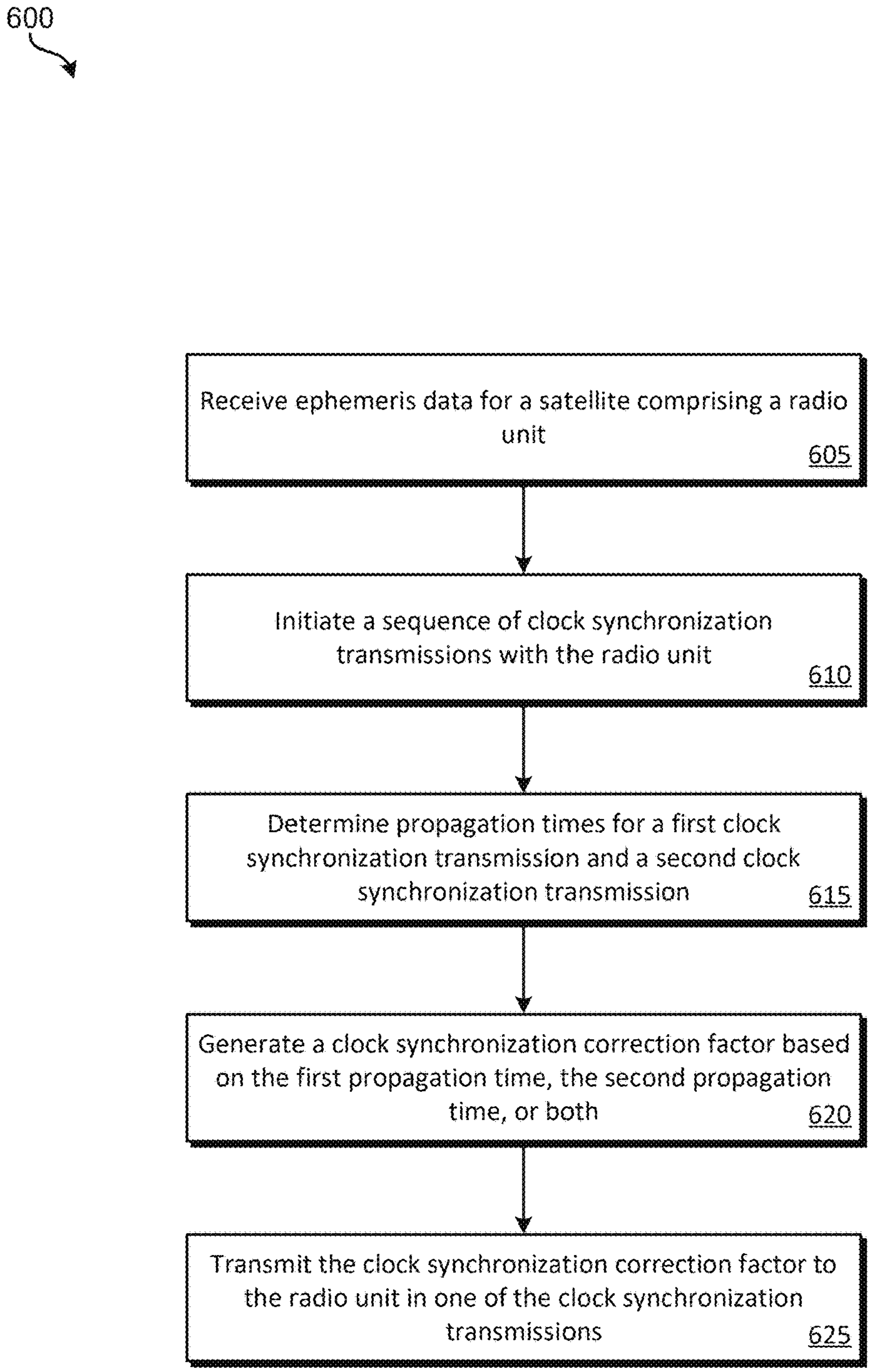
FIG. 6 illustrates an embodiment of a method for synchronizing clock signals between terrestrial and non-terrestrial components of a wireless network.

Various methods may be performed using the systems and arrangements detailed in relation to FIGS. 1-5. FIG. 6 illustrates an embodiment of a method for synchronizing clock signals between terrestrial and non-terrestrial components of a wireless network. The blocks of method 600 can be performed by one or more components of system 100, such as satellite gateway 138, RUs 125, and DUs 127.

At block 605, ephemeris data for a satellite comprising a radio unit may be received. The ephemeris data for the satellite may be received by a terrestrial component of a wireless network, such as a satellite gateway in communication with the satellite via a satellite antenna. The satellite gateway may also be connected via one or more wired connections with a DU configured to manage operations of the RU via the satellite gateway. In some embodiments, the satellite gateway is configured as a t-GM for the RU and the DU. Additionally, or alternatively, the satellite gateway may be configured as a t-BC that is synchronized by the DU as the t-GM, and synchronizes the RU to its internal clock.

At block 610, a sequence of clock synchronization transmissions are initiated with the satellite gateway. The sequence of clock synchronization transmissions may be part of a standardized clock synchronization protocol, such as PTP. For example, the sequence of clock synchronization transmissions may include: a first transmission (e.g., a Sync message) from the satellite gateway to the to the RU via the satellite feeder link; a second transmission (e.g., a Delay_Req message) transmitted from the RU via the satellite to the satellite gateway after receiving the first transmission; and a final transmission (e.g., a Delay_Resp message) transmitted by the satellite gateway to the RU via the satellite after receiving the second transmission.

As further described above, the first clock synchronization transmission may comprise a first timestamp generated from a clock signal of the satellite gateway at a first time when the first clock synchronization transmission is transmitted from the satellite gateway to the radio unit. The final clock synchronization transmission may comprise a second timestamp generated from the clock signal of the satellite gateway at a second time when the second clock synchronization transmission is received from the RU via the satellite by the satellite gateway.

At block 615, propagation times for a first clock synchronization transmission and a second clock synchronization transmission are determined. As described above, the first clock synchronization transmission may be a Sync message transmitted from a satellite gateway to the radio unit via the satellite and the second clock synchronization transmission may be a Delay_Req message transmitted from the radio unit via the satellite to the satellite gateway. The propagation times may be determined by the satellite gateway using the ephemeris data for the satellite and the location of the satellite gateway.

Determining a first propagation time for the first clock synchronization transmission may include determining a first distance between a first location of the satellite and the location of the satellite gateway at the time it is transmitted to the satellite. Additionally, or alternatively, determining the first propagation time for the first clock synchronization transmission may include determining a first distance between a first location of the satellite and the location of the satellite gateway at the time it is received at the satellite. In some embodiments, the first propagation time is calculated after transmitting the first clock synchronization transmission once the transmission time has been identified.

Additionally, or alternatively, the first propagation time may be calculated in advance of transmitting the first clock synchronization transmission to the satellite. For example, the first distance may be calculated based on a time in the future when the first clock synchronization transmission will be sent to the satellite. In some embodiments, the satellite gateway uses the ephemeris data for the satellite and the location of the satellite gateway to determine a first time when the first clock synchronization transmission can be received by the radio unit via the satellite from the satellite gateway. Based on the expected distance between the satellite and the satellite gateway at the first time, the satellite gateway may identify a second time before the first time where the difference between the first time and the second time is less than or equal to the propagation time for the expected distance. Once the second time is identified, satellite gateway may transmit the first clock synchronization transmission at the second time for receipt by the radio unit at the first time.

Determining a second propagation time for the second clock synchronization transmission may include determining a second distance between a second location of the satellite and the location of the satellite gateway at the time the second clock synchronization transmission is received by the satellite gateway. Additionally, or alternatively, determining the second propagation time for the second clock synchronization transmission may include determining a second distance between a second location of the satellite and the location of the satellite gateway at the time the second clock synchronization transmission is transmitted from the satellite. The second propagation time may be determined in response to receiving the second clock synchronization transmission from the radio unit.

At block 620, a clock synchronization correction factor is generated based on the first propagation time, the second propagation time, or both. In some embodiments, generating the clock synchronization correction factor comprises determining a difference between the first propagation time and the second propagation time. For example, and as described above in relation to FIG. 2, determining the correction factor may include subtracting the first propagation time from the second propagation time. In some embodiments, the clock synchronization correction factor is a first clock synchronization correction factor based on the value of the first propagation time and the method further comprises generating a second clock synchronization correction factor based on the value of the second propagation time.

At block 625, the clock synchronization correction factor is transmitted to the radio unit in one of the clock synchronization transmissions. For example, a clock synchronization correction factor based on the difference between the first propagation time and the second propagation time may be transmitted to the radio unit in the final clock synchronization transmission. In the case of two separate clock synchronization correction factors, one including the value of the first propagation time and the other including the value of the second propagation time, the first clock synchronization correction factor may be transmitted in the first clock synchronization transmission, or a Follow_Up message transmitted after the first clock synchronization transmission, and the second clock synchronization correction factor may be transmitted in the final clock synchronization transmission.

In some embodiments, transmitting the clock synchronization correction factor to the radio unit comprises updating a value in a preexisting field of a clock synchronization transmission defined by an industrial standard, such as the correction field of the Delay_Resp message defined by the IEEE 1588 standard. For example, the difference between the first propagation time and the second propagation time may be combined with other values to correct for additional delays, such as the delay between when a message is transmitted or received, and when the timestamp for the transmission or receipt is generated. Additionally, or alternatively, transmitting the clock synchronization correction factor to the radio unit may comprise modifying the first timestamp transmitted in the first clock synchronization transmission, the second timestamp transmitted in the final clock synchronization transmission, or both. For example, the second timestamp may be increased or decreased by the difference between the first propagation time and the second propagation time before being transmitted in the final clock synchronization transmission to the radio unit.

In response to receiving the final clock synchronization transmission from the satellite gateway, method 600 may proceed with the radio unit determining an offset between a clock signal of the radio unit and a clock signal of the satellite gateway. The offset may be determined from information about the sequence of clock synchronization transmissions in combination with the clock synchronization correction factor. As described above, the information about the sequence of clock synchronization transmissions may include: the first timestamp from the first clock synchronization transmission; the second timestamp from the final clock synchronization transmission; a third timestamp generated from the clock signal of the radio unit at a third time when the first clock synchronization transmission is received from the satellite gateway by the radio unit; and a fourth timestamp generated from the clock signal of the radio unit at a fourth time when the second clock synchronization transmission is transmitted from the radio unit to the satellite gateway.

Figure 7:
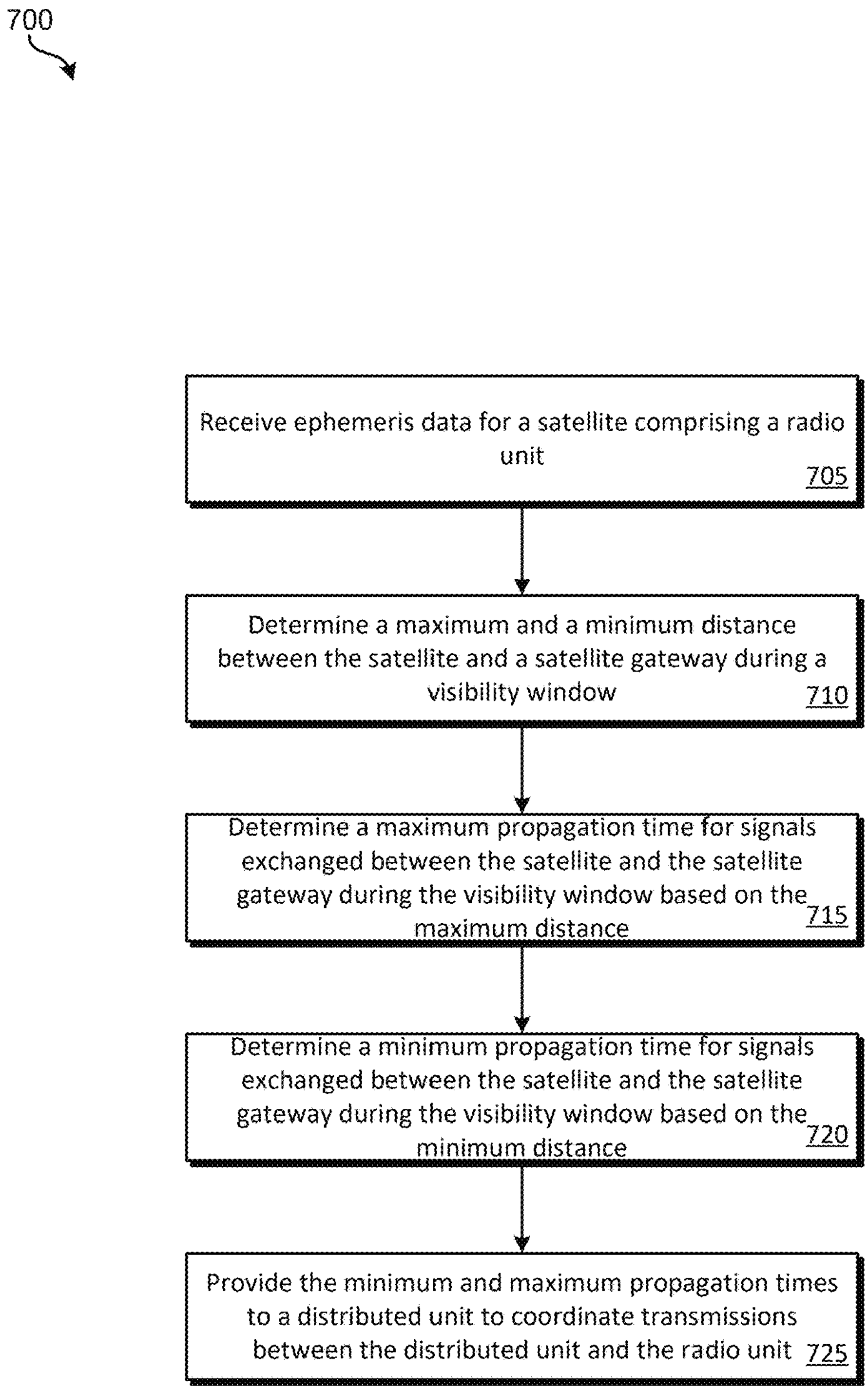
FIG. 7 illustrates an embodiment of a method for coordinating transmissions between terrestrial and non-terrestrial components of a wireless network.

FIG. 7 illustrates an embodiment of a method for coordinating transmissions between terrestrial and non-terrestrial components of a wireless network. The blocks of method 700 can be performed by one or more components of system 100, such as satellite gateway 138, RUS 125, and DUs 127. At block 705, ephemeris data for a satellite comprising a radio unit is received. The ephemeris data for the satellite may be received by a terrestrial component of a wireless network, such as a satellite gateway in communication with the satellite via a satellite antenna. The satellite gateway may also be connected via one or more wired connections with a DU configured to manage operations of the RU via the satellite gateway.

At block 710, a maximum and a minimum distance between the satellite and the satellite gateway during a visibility window is determined. As described above, the visibility window may include the portion of the satellite's orbit during which the satellite will be in line-of-sight communication with the satellite gateway. In some embodiments, the maximum and minimum distances are determined for all, or a portion, of the visibility window using the ephemeris data for the satellite. For example, the satellite gateway may determine the distance between the satellite and the satellite gateway when an elevation angle between the satellite gateway and the satellite is at a predefined minimum elevation angle. The predefined minimum elevation angle may be selected to avoid common obstructions that may exist in the line of sight of a satellite antenna of the satellite gateway, such as buildings, mountains, trees, or the like. For example, the predefined minimum elevation angle may be 5 degrees, 10 degrees, 15 degrees, or another angle selected to avoid objects that may obstruct the view from the satellite antenna. The satellite gateway may then determine the distance between the satellite and the satellite gateway when the satellite is at the upper culmination, or apex, of its pass with respect to the satellite gateway.

In some embodiments, the maximum and minimum distances are determined for a time period that begins at a start time when an elevation angle between the satellite gateway and the satellite is at a predefined minimum angle and that ends at an end time before the satellite reaches the upper culmination with respect to the satellite gateway. Additional maximum and minimum distances may then be determined for one or more remaining time periods within the visibility window, as further described above in relation to FIG. 5.

At block 715, a maximum propagation time for signals exchanged between the satellite and the satellite gateway during the visibility window are determined based on the maximum distance. The maximum propagation time may be determined by dividing the maximum distance between the satellite and the satellite gateway, or a satellite antenna of the satellite gateway, by the speed of light. As described above, the maximum propagation time may be based on the maximum distance between the satellite and the satellite gateway during all, or a portion, of the visibility window. For time period that is shorter than the whole visibility window, the maximum propagation time may be based on the maximum distance during the time period.

At block 720, a minimum propagation time for signals exchanged between the satellite and the satellite gateway during the visibility window are determined based on the minimum distance. The minimum propagation time may be determined by dividing the minimum distance between the satellite and the satellite gateway, or a satellite antenna of the satellite gateway, by the speed of light. As described above, the minimum propagation time may be based on the minimum distance between the satellite and the satellite gateway during all, or a portion, of the visibility window. For time period that is shorter than the whole visibility window, the minimum propagation time may be based on the minimum distance during the time period. For a period of time that includes the time when the satellite will be at the upper culmination of it's pass with respect to the satellite gateway, the minimum distance will be the distance between the satellite gateway and the location of the satellite at the upper culmination.

At block 725, the minimum and maximum propagation times are provided to a distributed unit to coordinate transmissions between the distributed unit and the radio unit. The satellite gateway may transmit the minimum and maximum propagation times to the distributed unit in response to a request from the distributed unit. In some embodiments, the minimum and maximum propagation times may be provided along with additional information about the visibility window, such as the start and end time of the visibility window, the start and end times of any sub-periods of time within the visibility window to which the propagation times correspond, information about the trajectory of the satellite over the surface of the Earth, or the like.

In some embodiments, method 700 proceeds with the receipt of the propagation times from the satellite gateway and the coordination of the transmissions with the radio unit of the satellite by the distributed unit via the satellite gateway. This may include coordinating a first reception time frame during a time period represented by the propagation times when the distributed unit will receive uplink data from the radio unit of the satellite and a first transmission time frame during the time period when the distributed unit will transmit downlink data to the radio unit, as described above in relation to FIG. 3.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A wireless network, comprising:
a satellite comprising a radio unit and an antenna;
a satellite gateway in communication with the satellite, wherein the satellite gateway is configured to:
receive ephemeris data for the satellite;
determine, using the ephemeris data and a location of the satellite gateway, a maximum distance and a minimum distance between the satellite and the satellite gateway during a time period when the satellite will be in line-of-sight communication with the satellite gateway;
determine, based on the maximum distance, a maximum propagation time for signals exchanged between the satellite and the satellite gateway during the time period; and
determine, based on the minimum distance, a minimum propagation time for the signals exchanged between the satellite and the satellite gateway during the time period; and
a distributed unit located on Earth and in communication with the satellite gateway, wherein the distributed unit is configured to:
receive the minimum propagation time and the maximum propagation time from the satellite gateway; and
coordinate with the radio unit of the satellite, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

2. The wireless network of claim 1, wherein the satellite gateway is further configured to:
determine, using the ephemeris data and the location of the satellite gateway, a first time when an elevation angle between the satellite gateway and the satellite will be at a predefined minimum elevation angle; and
determine that the time period will begin at the first time.

3. The wireless network of claim 2, wherein the predefined minimum elevation angle is greater than or equal to 10 degrees.

4. The wireless network of claim 2, wherein the satellite gateway is further configured to:
determine, using the ephemeris data and the location of the satellite gateway, a direction between the satellite gateway and the satellite at the first time; and
determine the predefined minimum elevation angle based on the direction.

5. The wireless network of claim 2, wherein the satellite gateway is further configured to:
determine, using the ephemeris data and the location of the satellite gateway, a second time after the first time when the elevation angle will be at the predefined minimum elevation angle; and
determine that the time period will end at the second time.

6. The wireless network of claim 2, wherein:
the time period ends at an end time before the satellite reaches an upper culmination with respect to the satellite gateway.

7. The wireless network of claim 6, wherein:
the time period is a first time period;
the minimum distance is a first minimum distance;
the minimum propagation time is a first minimum propagation time;
the satellite gateway is further configured to:
determine, using the ephemeris data and the location of the satellite gateway, a second minimum distance between the satellite and the satellite gateway during a second time period that begins at the end time; and
determine, based on the second minimum distance, a second minimum propagation time for second signals exchanged between the satellite and the satellite gateway during the second time period; and
the distributed unit is further configured to:
receive the second minimum propagation time from the satellite gateway; and
coordinate with the radio unit of the satellite, via the satellite gateway, a second reception time frame during the second time period when the distributed unit will receive second uplink data from the radio unit of the satellite and a second transmission time frame during the second time period when the distributed unit will transmit second downlink data to the radio unit of the satellite using the first minimum propagation time and the second minimum propagation time.

8. The wireless network of claim 1, wherein the distributed unit is configured to coordinate the first reception time frame and the first transmission time frame by:
measuring a minimum downlink latency and a maximum downlink latency for downlink signals transmitted from the distributed unit to the satellite gateway;
combining the minimum downlink latency with the minimum propagation time and a maximum internal downlink delay for the radio unit of the satellite to determine an earliest time when the distributed unit will transmit the downlink data to the radio unit of the satellite;
combining the maximum downlink latency with the maximum propagation time and a minimum internal downlink delay for the radio unit of the satellite to determine a latest time when the distributed unit will transmit the downlink data to the radio unit of the satellite;
measuring a minimum uplink latency and a maximum uplink latency for uplink signals transmitted from the satellite gateway to the distributed unit;
combining the minimum uplink latency with the minimum propagation time and a minimum internal uplink delay for the radio unit of the satellite to determine an earliest time when the distributed unit will receive the uplink data from the radio unit of the satellite; and
combining the maximum uplink latency with the maximum propagation time and a maximum internal uplink delay for the radio unit to determine a latest time when the distributed unit will receive the uplink data from the radio unit of the satellite.

9. The wireless network of claim 8, wherein the distributed unit measures the minimum downlink latency, the maximum downlink latency, the minimum uplink latency, and the maximum uplink latency according to the enhanced Common Public Radio Interface (eCPRI) standard.

10. A method of coordinating transmissions between terrestrial and non-terrestrial components of a wireless network, comprising:

receiving, by a satellite gateway, ephemeris data for a satellite, wherein the satellite comprises a radio unit;

determining, by the satellite gateway using the ephemeris data and a location of the satellite gateway, a maximum distance and a minimum distance between the satellite and the satellite gateway during a time period when the satellite will be in line-of-sight communication with the satellite gateway;

determining, by the satellite gateway, a maximum propagation time for signals exchanged between the satellite and the satellite gateway during the time period based on the maximum distance;

determining, by the satellite gateway, a minimum propagation time for the signals exchanged between the satellite and the satellite gateway during the time period based on the minimum distance; and providing, by the satellite gateway, the minimum propagation time and the maximum propagation time to a distributed unit;

wherein, in response to receiving the minimum propagation time and the maximum propagation time, the distributed unit coordinates with the radio unit, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

11. The method of coordinating transmissions between terrestrial and non-terrestrial components of a wireless network of claim 10, further comprising:

determining, using the ephemeris data and the location of the satellite gateway, a first time when an elevation angle between the satellite gateway and the satellite will be at a predefined minimum elevation angle; and determining that the time period will begin at the first time.

12. The method of coordinating transmissions between terrestrial and non-terrestrial components of a wireless network of claim 11, wherein the predefined minimum elevation angle is greater than or equal to 10 degrees.

13. The method of coordinating transmissions between terrestrial and non-terrestrial components of a wireless network of claim 11, further comprising:

determining, using the ephemeris data and the location of the satellite gateway, a direction between the satellite gateway and the satellite at the first time; and determining the predefined minimum elevation angle based on the direction.

14. The method of coordinating transmissions between terrestrial and non-terrestrial components of a wireless network of claim 11, further comprising:

determining, using the ephemeris data and the location of the satellite gateway, a second time after the first time when the elevation angle will be at the predefined minimum elevation angle; and determining that the time period will end at the second time.

15. The method of coordinating transmissions between terrestrial and non-terrestrial components of a wireless network of claim 10, wherein:

the time period is a first time period that ends at an end time before the satellite reaches an upper culmination with respect to the satellite gateway;

the minimum distance is a first minimum distance;

the minimum propagation time is a first minimum propagation time;

the method further comprises:

determining, using the ephemeris data and the location of the satellite gateway, a second minimum distance between the satellite and the satellite gateway during a second time period that begins at the end time;

determining, based on the second minimum distance, a second minimum propagation time for second signals exchanged between the satellite and the satellite gateway during the second time period; and providing the second minimum propagation time to the distributed unit; and in response to receiving the second minimum propagation time, the distributed unit coordinates with the radio unit of the satellite, via the satellite gateway, a second reception time frame during the second time period when the distributed unit will receive second uplink data from the radio unit of the satellite and a second transmission time frame during the second time period when the distributed unit will transmit second downlink data to the radio unit of the satellite using the first minimum propagation time and the second minimum propagation time.

16. The method of coordinating transmissions between terrestrial and non-terrestrial components of a wireless network of claim 10, further comprising:

measuring a minimum downlink latency and a maximum downlink latency for downlink signals transmitted from the distributed unit to the satellite gateway;

combining the minimum downlink latency with the minimum propagation time and a maximum internal downlink delay for the radio unit of the satellite to determine an earliest time when the distributed unit will transmit the downlink data to the radio unit of the satellite;

combining the maximum downlink latency with the maximum propagation time and a minimum internal downlink delay for the radio unit of the satellite to determine a latest time when the distributed unit will transmit the downlink data to the radio unit of the satellite;

measuring a minimum uplink latency and a maximum uplink latency for uplink signals transmitted from the satellite gateway to the distributed unit;

combining the minimum uplink latency with the minimum propagation time and a minimum internal uplink delay for the radio unit of the satellite to determine an earliest time when the distributed unit will receive the uplink data from the radio unit of the satellite; and combining the maximum uplink latency with the maximum propagation time and a maximum internal uplink delay for the radio unit to determine a latest time when the distributed unit will receive the uplink data from the radio unit of the satellite.

17. The method of coordinating transmissions between terrestrial and non-terrestrial components of a wireless network of claim 16, wherein the minimum downlink latency, the maximum downlink latency, the minimum uplink latency, and the maximum uplink latency are measured according to the enhanced Common Public Radio Interface (eCPRI) standard.

18. A satellite gateway, comprising:

one or more processors; and a memory connected to the one or more processors storing one or more computer-readable instructions which, when executed by the one or more processors, cause the one or more processors to:

receive ephemeris data for a satellite that comprises a radio unit and an antenna;

determine, using the ephemeris data and a location of the satellite gateway, a maximum distance and a minimum distance between the satellite and the satellite gateway during a time period when the satellite will be in line-of-sight communication with the satellite gateway;

determine, based on the maximum distance, a maximum propagation time for signals exchanged between the satellite and the satellite gateway during the time period;

determine, based on the minimum distance, a minimum propagation time for the signals exchanged between the satellite and the satellite gateway during the time period; and provide the minimum propagation time and the maximum propagation time to a distributed unit;

wherein, in response to receiving the minimum propagation time and the maximum propagation time, the distributed unit coordinates with the radio unit, via the satellite gateway, a first reception time frame during the time period when the distributed unit will receive uplink data from the radio unit of the satellite and a first transmission time frame during the time period when the distributed unit will transmit downlink data to the radio unit of the satellite using the minimum propagation time and the maximum propagation time.

19. The satellite gateway of claim 18, wherein the one or more computer-readable instructions further cause the one or more processors to:

determine, using the ephemeris data and the location of the satellite gateway, a first time when an elevation angle between the satellite gateway and the satellite will be at a predefined minimum elevation angle; and determine that the time period will begin at the first time.

20. The satellite gateway of claim 19, wherein the one or more computer-readable instructions further cause the one or more processors to:

determine, using the ephemeris data and the location of the satellite gateway, a second time after the first time when the elevation angle will be at the predefined minimum elevation angle; and determine that the time period will end at the second time.

* * * * *